(12) United States Patent
Kim et al.

(10) Patent No.: US 12,429,922 B2
(45) Date of Patent: Sep. 30, 2025

(54) WINDOW AND DISPLAY DEVICE INCLUDING THE SAME

(71) Applicant: Samsung Display Co., Ltd., Yongin-si (KR)

(72) Inventors: Sunghoon Kim, Hwaseong-si (KR); Kyung-Man Kim, Anyang-si (KR); Dawoon Kim, Yongin-si (KR); Sanghoon Kim, Hwaseong-si (KR); Seungho Kim, Asan-si (KR); Yuri Kim, Guri-si (KR); Min-Hoon Choi, Seoul (KR); Seongjin Hwang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 439 days.

(21) Appl. No.: 17/893,626

(22) Filed: Aug. 23, 2022

(65) Prior Publication Data
US 2023/0195174 A1   Jun. 22, 2023

(30) Foreign Application Priority Data
Dec. 17, 2021   (KR) .......................... 10-2021-0182175

(51) Int. Cl.
   *G06F 1/16*    (2006.01)
   *G09F 9/30*    (2006.01)

(52) U.S. Cl.
   CPC .......... *G06F 1/1656* (2013.01); *G06F 1/1616* (2013.01); *G06F 1/1652* (2013.01); *G09F 9/301* (2013.01)

(58) Field of Classification Search
   CPC ............. Y10T 428/2457; G06F 1/1641; G06F 1/1652; G06F 1/1616; G06F 1/1656; H04M 1/0268; H04M 1/0222; G09F 9/301
   See application file for complete search history.

(56) References Cited

U.S. PATENT DOCUMENTS 10,020,462 B1   7/2018   Ai et al.
10,314,184 B2   6/2019   Choi et al.
(Continued)

FOREIGN PATENT DOCUMENTS

KR   1020180079093 A   7/2018
KR   102068685 B1      1/2020
(Continued)

OTHER PUBLICATIONS

Wansun Kim et al. "Controlled multiple neutral planes by low elastic modulus adhesive for flexible organic photovoltaics" Nanotechnology 28 (2017) 194002 (9 Pages).

*Primary Examiner* — Catherine A. Simone
(74) *Attorney, Agent, or Firm* — CANTOR COLBURN LLP

(57) ABSTRACT

A window includes a first folding portion foldable about a first folding axis extended in a first direction, and including upper and lower surfaces facing each other, and a second folding portion foldable about a second folding axis extended in a second direction crossing the first direction, including the upper and lower surfaces, and including a portion of the first folding portion. First upper grooves extended in the first direction and recessed from the upper surface and first lower grooves extended in the first direction and recessed from the lower surface are defined in the first folding portion, and second upper grooves extended in the second direction and recessed from the upper surface and second lower grooves extended in the second direction and recessed from the lower surface are defined in the second folding portion. The portion is defined as a crossing portion in which the grooves are defined.

19 Claims, 28 Drawing Sheets

(56) References Cited

U.S. PATENT DOCUMENTS

2016/0224068 A1* 8/2016 Choi .................. G06F 3/045
2020/0292731 A1 9/2020 Park et al.
2022/0011813 A1 1/2022 Kim et al.

FOREIGN PATENT DOCUMENTS

KR  1020200079956 A  7/2020
KR  1020220006672 A  1/2022

* cited by examiner

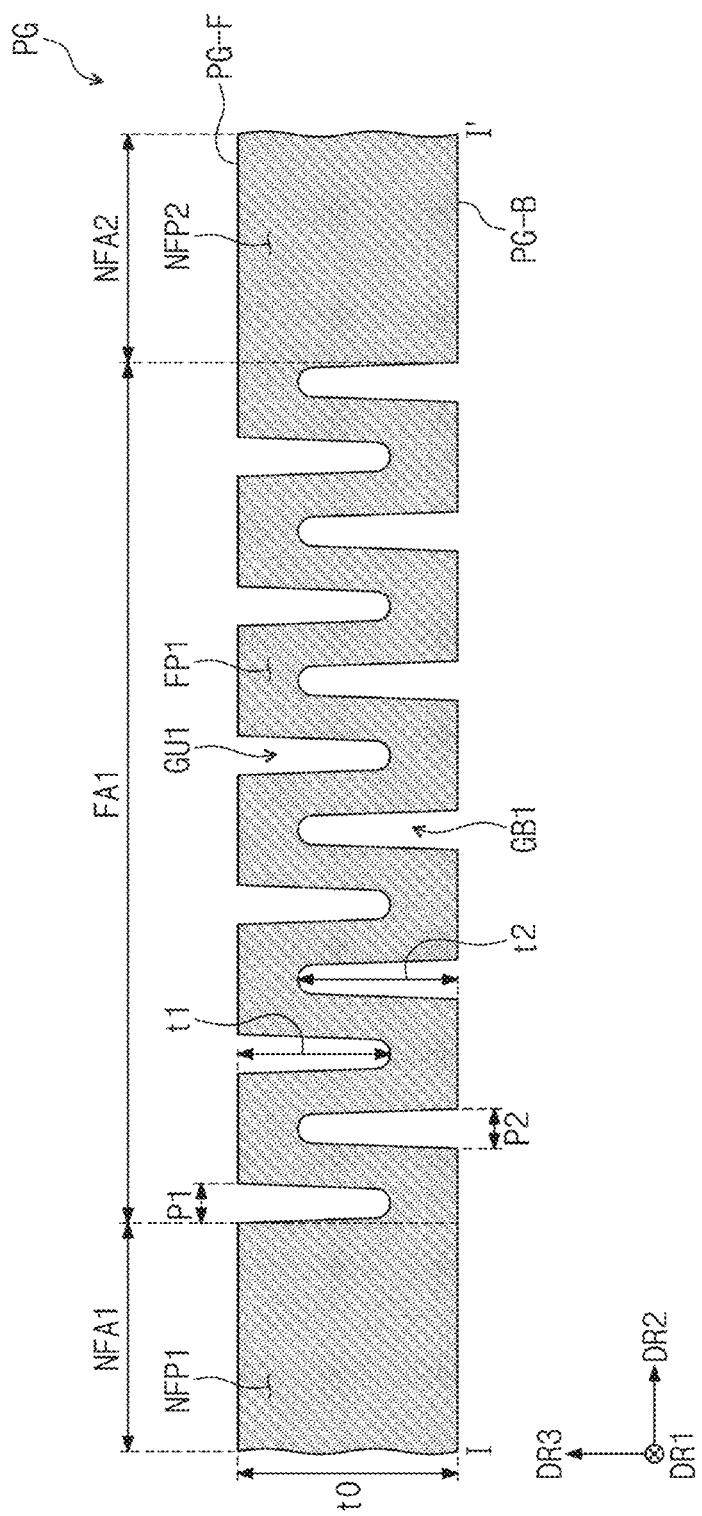

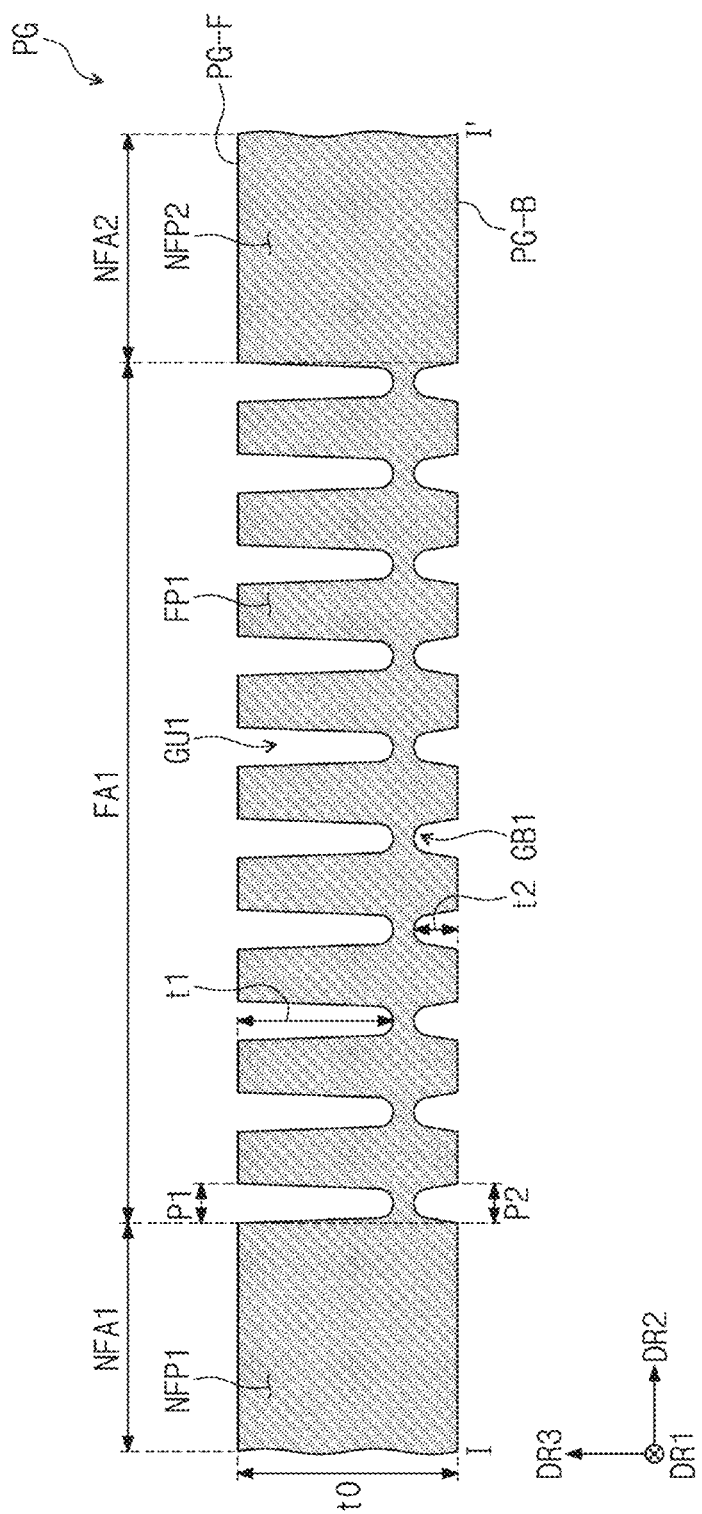

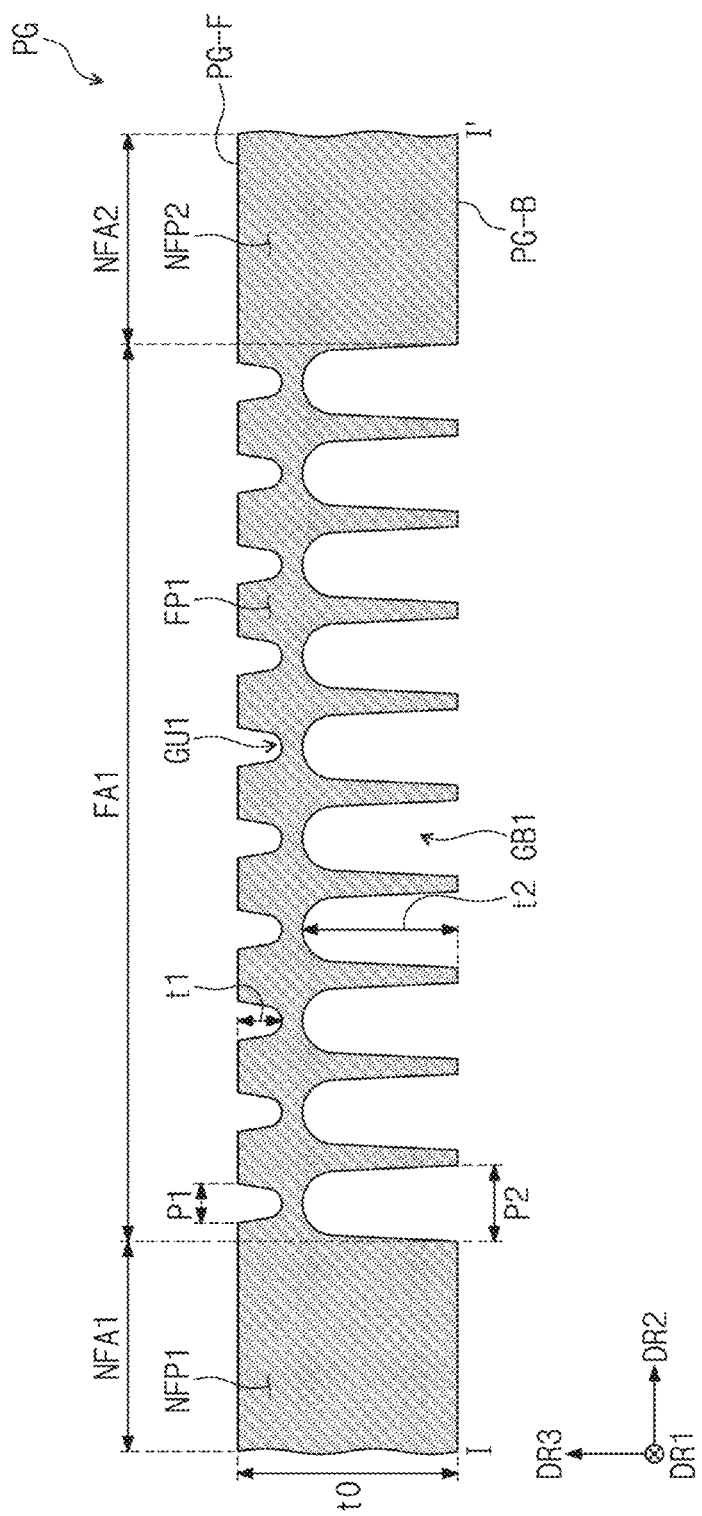

WINDOW AND DISPLAY DEVICE INCLUDING THE SAME

This application claims priority to Korean Patent Application No. 10-2021-0182175, filed on Dec. 17, 2021, and all the benefits accruing therefrom under 35 U.S.C. § 119, the content of which in its entirety is herein incorporated by reference.

BACKGROUND

1. Field

Embodiments of the invention herein relate to a window and a display device including the same, and more particularly, to a foldable window and a display device including the same.

2. Description of the Related Art

A display device is used in various multimedia devices such as a television, a mobile phone, a tablet computer, a game console, or the like, to provide image information to a user. Recently, various types of flexible display devices which are foldable or bendable are being developed. A flexible device may be variously changed in shape, such as being folded, rolled, or bent, and thus, has a feature of being easy to carry.

A flexible display device may include a display panel and a window which are foldable or bendable. However, there is a problem in that a window of a flexible display device is deformed by a folding or bending operation or is easily damaged by an external impact.

SUMMARY

Embodiments of the invention provide a window having excellent folding properties and mechanical physical properties.

Embodiments of the invention also provide a display device including a window having excellent folding properties and mechanical physical properties.

An embodiment of the invention provides a window including a first folding portion foldable about a first folding axis extended in a first direction, and including an upper surface and a lower surface facing each other, and a second folding portion foldable about a second folding axis extended in a second direction crossing the first direction, including the upper surface, the lower surface, and a portion of the first folding portion. A plurality of first upper grooves each of which is extended in the first direction and recessed from the upper surface and a plurality of first lower grooves each of which is extended in the first direction and recessed from the lower surface are defined in the first folding portion, and a plurality of second upper grooves each of which is extended in the second direction and recessed from the upper surface and a plurality of second lower grooves each of which is extended in the second direction and recessed from the lower surface are defined in the second folding portion, wherein the portion of the first folding portion included in the second folding portion is defined as a crossing portion. The plurality of first upper grooves, the plurality of first lower grooves, the plurality of second upper grooves, and the plurality of second lower grooves are disposed in the crossing portion.

In an embodiment, the window may further include a first peripheral portion and a second peripheral portion spaced apart from each other in the second direction with the first folding portion interposed therebetween. The plurality of second upper grooves and the plurality of second lower grooves may be defined in a portion of each of the first peripheral portion and the second peripheral portion.

In an embodiment, each of the first peripheral portion, the first folding portion, and the second peripheral portion may be foldable about the second folding axis.

In an embodiment, the window may further include a third peripheral portion and a fourth peripheral portion spaced apart from each other in the first direction with the second folding portion interposed therebetween. The plurality of first upper grooves and the plurality of first lower grooves may be defined in a portion of each of the third peripheral portion and the fourth peripheral portion.

In an embodiment, each of the third peripheral portion, the second folding portion, and the fourth peripheral portion may be foldable about the first folding axis.

In an embodiment, the plurality of first upper grooves and the plurality of first lower grooves may not overlap each other in a plan view.

In an embodiment, the plurality of first upper grooves and the plurality of first lower grooves may be alternately defined with each other.

In an embodiment, the plurality of first upper grooves and the plurality of first lower grooves may overlap each other in a plan view.

In an embodiment, an average value of heights at which the plurality of first upper grooves is recessed from the upper surface may be substantially identical to an average value of heights at which the plurality of first lower grooves is recessed from the lower surface.

In an embodiment, an average value of heights at which the plurality of first upper grooves is recessed from the upper surface may be different from an average value of heights at which the plurality of first lower grooves is recessed from the lower surface.

In an embodiment, an average value of widths of the plurality of first upper grooves measured in the second direction from the upper surface may be substantially identical to an average value of widths of the plurality of first lower grooves measured in the second direction from the lower surface.

In an embodiment, an average value of widths of the plurality of first upper grooves measured in the second direction from the upper surface may be different from an average value of widths of the plurality of first lower grooves measured in the second direction from the lower surface.

In an embodiment, the crossing portion may be defined in a center portion of each of the first folding portion and the second folding portion.

In an embodiment, the plurality of first upper grooves each and the plurality of first lower grooves each may be spaced apart from each other in the second direction, and the plurality of second upper grooves each and the plurality of second lower grooves each may be spaced apart from each other in the first direction.

In an embodiment, the plurality of first upper grooves and the plurality of first lower grooves may each be symmetrical about the first folding axis.

In an embodiment, the plurality of second upper grooves and the plurality of second lower grooves may each be symmetrical around the second folding axis.

In an embodiment of the invention, a window includes a first portion, a second portion, and a third portion sequentially defined in a first direction, a fourth portion, a fifth portion, and a sixth portion sequentially defined in the first direction, overlapping each of the first to third portions in a second direction crossing the first direction, and disposed respectively below the first to third portions in the second direction, and a seventh portion, an eighth portion, and a ninth portion sequentially defined in the first direction, overlapping each of the first to third portions in the second direction, and disposed respectively below the fourth to sixth portions in the second direction in the second direction. Upper surfaces of the first to ninth portions are disposed in a same plane, and together define a first surface, each of lower surfaces of the first to ninth portions are disposed in a same plane, and together define a second surface, a plurality of first upper grooves recessed from the first surface and extended in the first direction is defined in each of the fourth to sixth portions, and a plurality of second upper grooves recessed from the first surface and extended in the second direction is defined in each of the second portion, the fifth portion, and the eighth portion.

In an embodiment, a plurality of first lower grooves recessed from the second surface and extended in the first direction may be further defined in each of the fourth to sixth portions, and a plurality of second lower grooves recessed from the second surface and extended in the second direction may be further defined in each of the second portion, the fifth portion, and the eighth portion.

In an embodiment, the fourth to sixth portions may be foldable about a first folding axis extended in the first direction, and the second portion, the fifth portion, and the eighth portion may be foldable about a second folding axis extended in the second direction.

In an embodiment of the invention, a display device includes a foldable display module, and a window disposed on the display module. The window includes a first folding portion foldable about a first folding axis extended in a first direction, and including an upper surface and a lower surface facing each other, and a second folding portion foldable about a second folding axis extended in a second direction crossing the first direction, including the upper surface and the lower surface, and including a portion of the first folding portion. A plurality of first upper grooves each of which is extended in the first direction and recessed from the upper surface and a plurality of first lower grooves each of which is extended in the first direction and recessed from the lower surface are defined in the first folding portion, and a plurality of second upper grooves each of which is extended in the second direction and recessed from the upper surface and a plurality of second lower grooves each of which is extended in the second direction and recessed from the lower surface are defined in the second folding portion. The portion of the first folding portion included in the second folding portion is defined as a crossing portion. The plurality of first upper grooves, the plurality of first lower grooves, the plurality of second upper grooves, and the plurality of second lower grooves are disposed in the crossing portion.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings:

FIG. 5C to FIG. 5E are cross-sectional views illustrating a portion of a cross-section of a window according to the invention;

FIG. 9A to FIG. 9E are cross-sectional views illustrating an embodiment of a portion of a cross-section of a window according to the invention;

DETAILED DESCRIPTION

Figure 1:
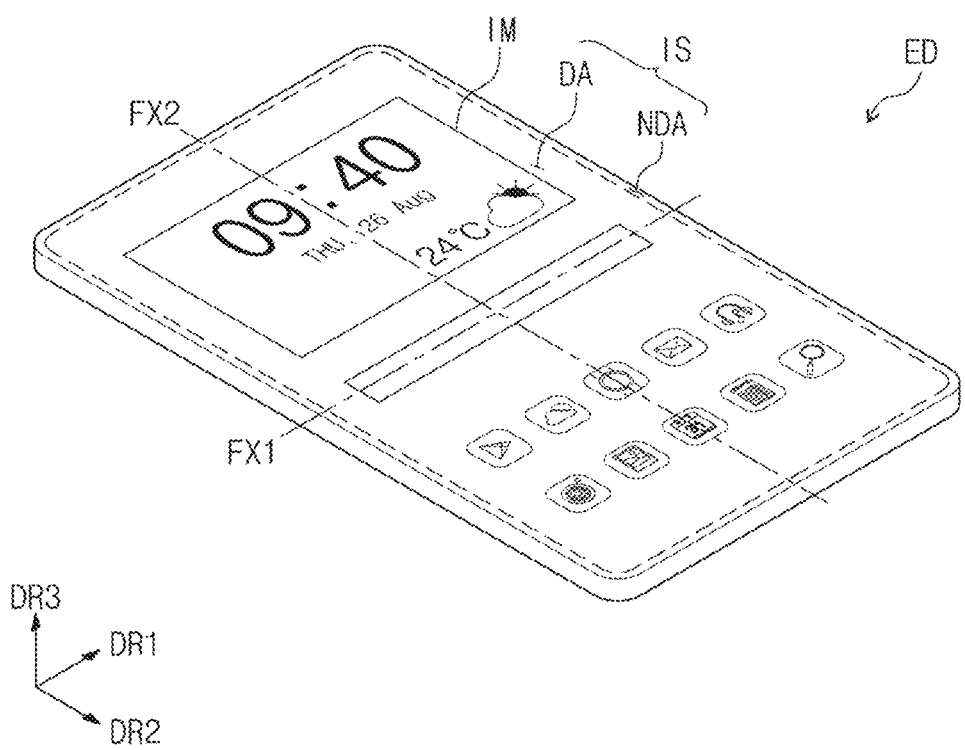
FIG. 1 is a perspective view illustrating an embodiment of the state in which an electronic device is not folded according to the invention.

In the disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or" includes any and all combinations of one or more of which associated elements may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the invention. The terms of a singular form may include plural forms unless the context clearly indicates otherwise.

In addition, terms such as "below," "lower," "above," "upper," and the like are used to describe the relationship of the elements shown in the drawings. The terms are used as a relative concept and are described with reference to the direction indicated in the drawings.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

In the disclosure, being "directly disposed" may mean that there is no layer, film, region, plate, or the like added between a portion of a layer, a film, a region, a plate, or the like and other portions. For example, being "directly disposed" may mean being disposed without additional members such as an adhesive member between two layers or two members.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which the invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, embodiments of the invention will be described with reference to the accompanying drawings.

FIG. 1 is a perspective view illustrating an embodiment of the state in which an electronic device is not folded according to the invention. FIG. 2A to FIG. 2D are each a perspective view illustrating an embodiment of the state in which an electronic device is folded according to the invention.

An electronic device ED may be a device activated in accordance with an electrical signal to provide an image IM. In FIG. 1, the electronic device ED is illustrated as a smart phone as an example. However, the invention is not limited thereto, and the electronic device ED of the invention may be a large-sized electronic device such as a television and a monitor, and may be a small-and-medium-sized electronic device such as a mobile phone, a tablet computer, a car navigation system unit, and a game console. In addition, without departing from the inventive concept, the electronic device ED may be used in a variety of electronic devices without being limited to the examples described above.

Referring to FIG. 1, the front surface of the electronic device ED may be defined as a display surface IS. When not folded, the display surface IS of the electronic device ED may correspond to a surface defined by a first direction DR1 and a second direction DR2 crossing the first direction DR1. The display surface IS may display the image IM toward a third direction DR3.

In the drawings of the invention, the first to third directions DR1, DR2, and DR3 are illustrated, and the first to third directions DR1, DR2, and DR3 described in the disclosure are relative concepts, and may be converted to different directions. Directions indicated by the first to third directions DR1, DR2, and DR3 are illustrated using the same reference numerals in each of the drawings.

In the disclosure, the front surface (or upper surface) and the rear surface (or lower surface) of each component may be defined with respect to a direction in which the image IM is displayed. The upper surface and the lower surface face each other in the third direction DR3, and the normal direction of each of the upper surface and the lower surface may be parallel to the third direction DR3. A distance spaced apart along the third direction DR3 between the upper and lower surfaces of a component may correspond to the thickness of the component. A term "in a plan view" in the disclosure may correspond to viewing a component in the third direction DR3.

The display surface IS of the electronic device ED may include a display region DA and a non-display region NDA. The display region DA may be a region in which the image IM is displayed. The non-display region NDA may be a region in which the image IM is not displayed. A user may visually recognize the image IM displayed through the display region DA. The image IM may a moving image or a still image. In an embodiment of the image IM, a plurality of application icons, a clock widget, or the like are illustrated in FIG. 1.

The display region DA may have a quadrangular shape. However, this is only exemplary, and the shape of the display region DA may be variously designed. The non-display region NDA may surround the display region DA. However, the invention is not limited thereto, and the non-display region NDA may be adjacent to only one side of the display region DA, or may be omitted.

As illustrated in FIG. 1, the electronic device ED may have a quadrangular (e.g., rectangular) shape which includes short sides extended along the first direction DR1, long sides extended along the second direction DR2, and rounded corners. However, the shape of the electronic device ED is not limited thereto, and the electronic device ED may be provided in various shapes.

Although the electronic device ED in which a one-sided display surface IS is illustrated, the electronic device ED may have a double-sided display surface in which the display surface IS is defined on both of the front surface and the rear surface. A display surface of the electronic device ED is not limited to any particular embodiment.

The electronic device ED in an embodiment may be a foldable electronic device. The electronic device ED may be foldable about a virtual folding axis extended in a predetermined direction. FIG. 1 illustrates a first folding axis FX1 extended along the first direction DR1, and a second folding axis FX2 extended along the second direction DR2. The first folding axis FX1 may be parallel to a short-side direction of the electronic device ED. The second direction FX2 may be parallel to a long-side direction of the electronic device ED. The electronic device ED in an embodiment may be folded about each of the first folding axis FX1 and the second folding axis FX2. In an embodiment, the electronic device ED may be folded about the first folding axis FX1, and/or may be folded about the second folding axis FX2, for example.

Figure 2A:
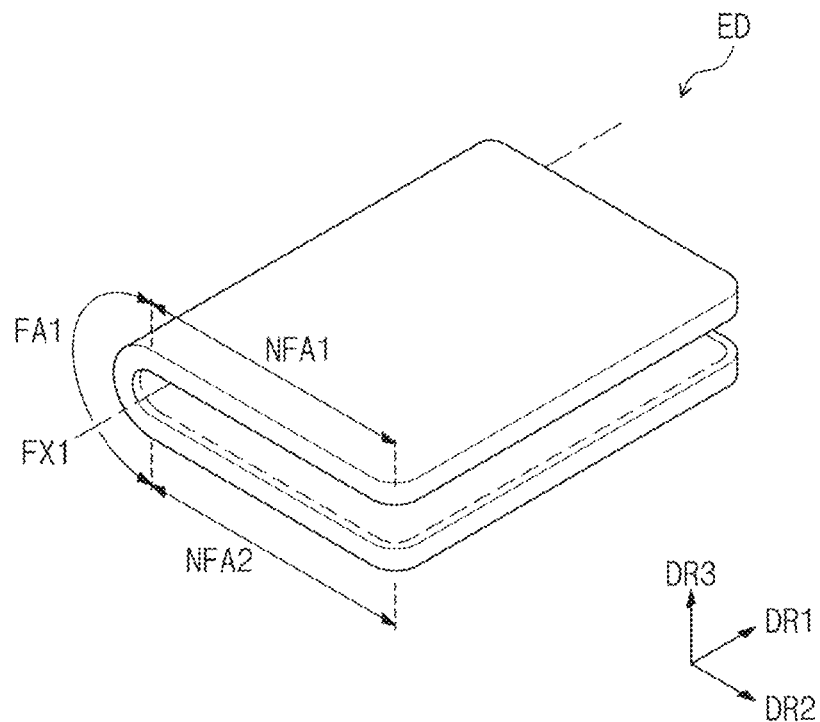
FIG. 2A to FIG. 2D are each a perspective view illustrating an embodiment of the state in which an electronic device is folded according to the invention.
Figure 2B:
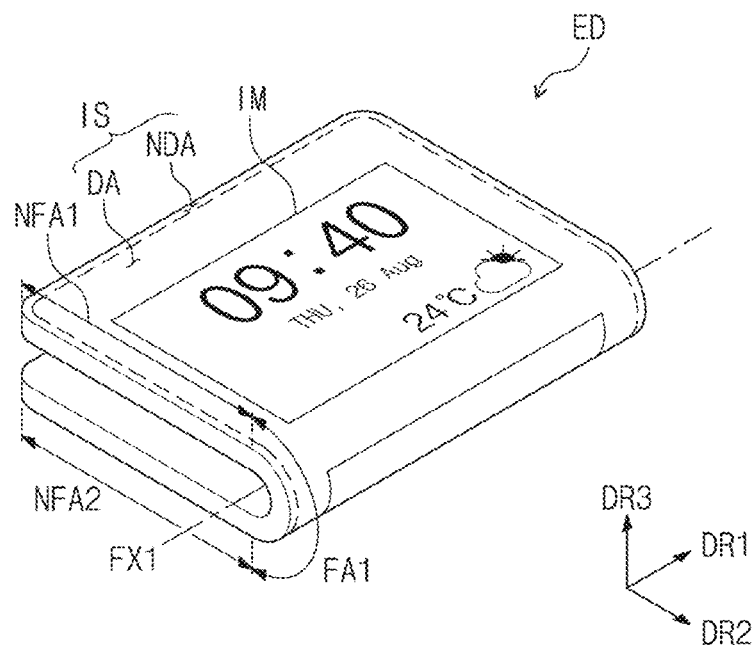
Figure 2C:
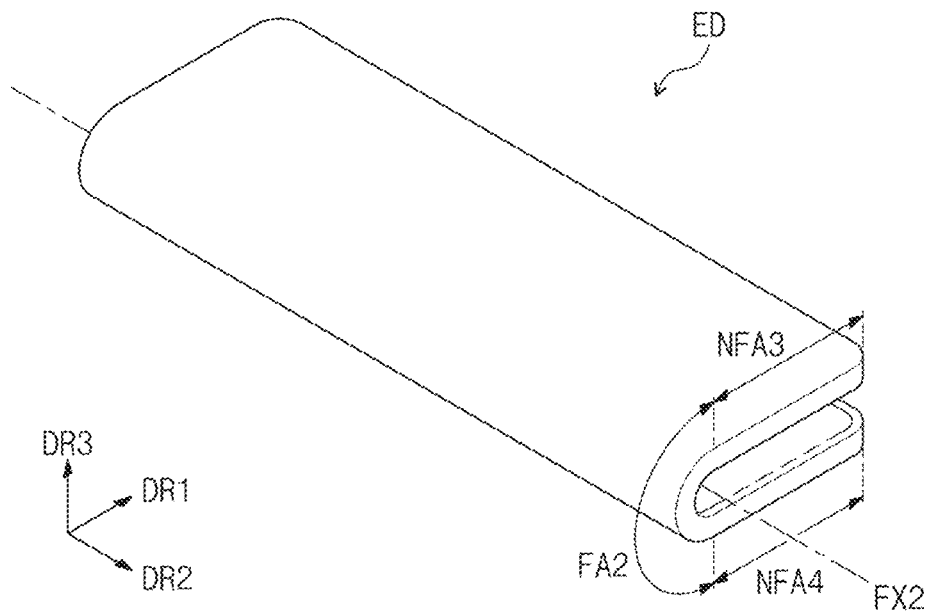
Figure 2D:
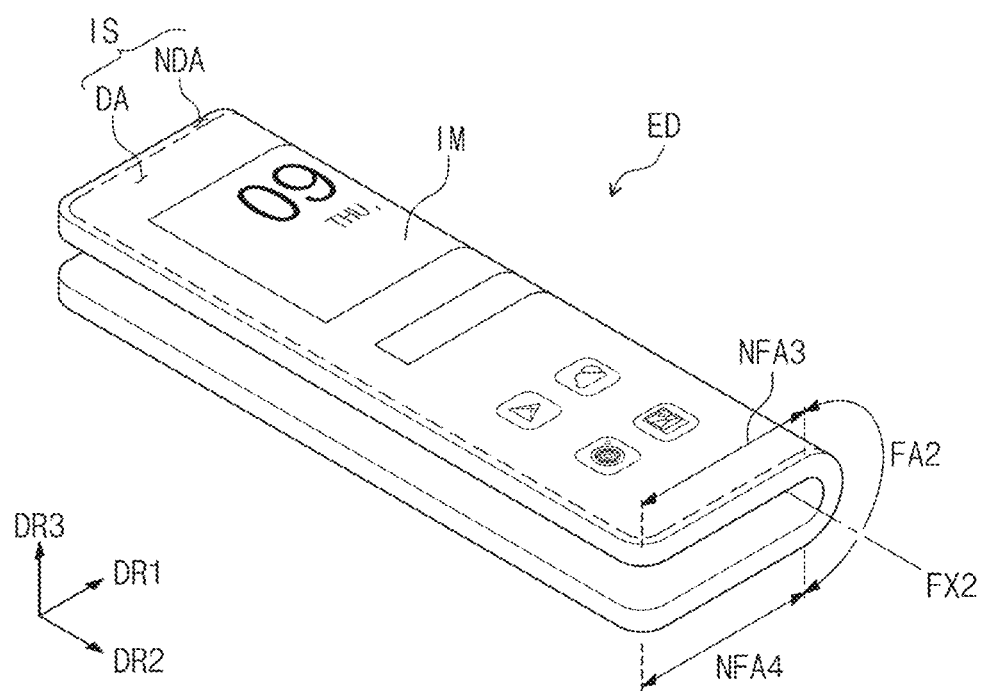

FIG. 2A and FIG. 2B illustrate perspective views in which an embodiment of the electronic device ED is folded about the first folding axis FX1. FIG. 2C and FIG. 2D illustrate perspective views in which an embodiment of the electronic device ED is folded about the second folding axis FX2.

The perspective views illustrated in FIG. 2A to FIG. 2D may be perspective views of one electronic device ED. Specifically, the electronic device ED illustrated in FIG. 2C and FIG. 2 may be the electronic device ED illustrated in FIG. 2A and FIG. 2B folded about the second folding axis FX2.

The electronic device ED may be divided into a folding region and a non-folding region depending on the type of an operation. The folding region may be a region bent to have a predetermined curvature when the electronic device ED is folded about a folding axis. The non-folding region may be a flat region when the electronic device ED is folded about a folding axis.

The electronic device ED may include at least one folding region and at least one non-folding region. The definition of the folding region and the non-folding region may be defined relative to a folding axis. In an embodiment, each of a folding region and a non-folding region defined when the electronic device ED is folded about the first folding axis FX1 may not be the same as a folding region and a non-folding region defined when the electronic device ED is folded about the second folding axis FX2, for example.

Referring to FIG. 2A and FIG. 2B, the electronic device ED folded about the first folding axis FX1 may include a first folding region FA1, a first non-folding region NFA1, and a second non-folding region NFA2. The first folding region FA1 may be a region folded at a predetermined curvature while surrounding the first folding axis FX1. The first non-folding region NFA1 may be adjacent to one side of the first folding region FA1 along the second direction DR2, and the second non-folding region NFA2 may be adjacent to the other side of the first folding region FA1 along the second direction DR2.

Referring to FIG. 2C and FIG. 2D, the electronic device ED folded about the second folding axis FX2 may include a second folding region FA2, a third non-folding region NFA3, and a fourth non-folding region NFA4. The second folding region FA2 may be a region folded at a predetermined curvature while surrounding the second folding axis FX2. The third non-folding region NFA3 may be adjacent to one side of the second folding region FA2 along the first direction DR1, and the fourth non-folding region NFA4 may be adjacent to the other side of the second folding region FA2 along the first direction DR1.

Each of the FIG. 2A to FIG. 2D illustrates one folding axis, but the number of folding axes is not limited thereto, and the number of folding regions and non-folding regions is not also limited to what is illustrated.

The electronic device ED may be in-folded or out-folded. When the display surface IS overlapping a folding region of the electronic device ED is folded to face a folding axis, it may be defined as in-folding. When a rear surface overlapping a folding region of the electronic device ED is folded to face a folding axis, it may be defined as out-folding. The electronic device ED may be manufactured to be capable of both in-folding and out-folding operations, or may be manufactured to be capable of any one of in-folding and out-folding operations.

FIG. 2A illustrates the electronic device ED in-folded about the first folding axis FX1, and FIG. 2C illustrates the electronic device ED in-folded about the second folding axis FX2. FIG. 2B illustrates the electronic device ED out-folded about the first folding axis FX1, and FIG. 2D illustrates the electronic device ED out-folded about the second folding axis FX2.

Referring to FIG. 2A, portions of the display surface IS respectively overlapping the first non-folding region NFA1 and the second non-folding region NFA2 of the in-folded electronic device ED may face each other. Referring to FIG. 2C, portions of the display surface IS respectively overlapping the third non-folding region NFA3 and the fourth non-folding region NFA4 of the in-folded electronic device ED may face each other. The rear surface of the in-folded electronic device ED may be exposed to the outside.

Referring to FIG. 2B, the display surface IS overlapping the first non-folding region NFA1 and the second non-folding region NFA2 of the out-folded electronic device ED may be exposed to the outside in directions opposite to each other. Referring to FIG. 2D, the display surface IS overlapping the third non-folding region NFA3 and the fourth non-folding region NFA4 of the out-folded electronic device ED may be exposed to the outside in directions opposite to each other. Through the above, the image IM provided by the electronic device ED in a folded state may be visually recognized by a user.

Figure 3A:
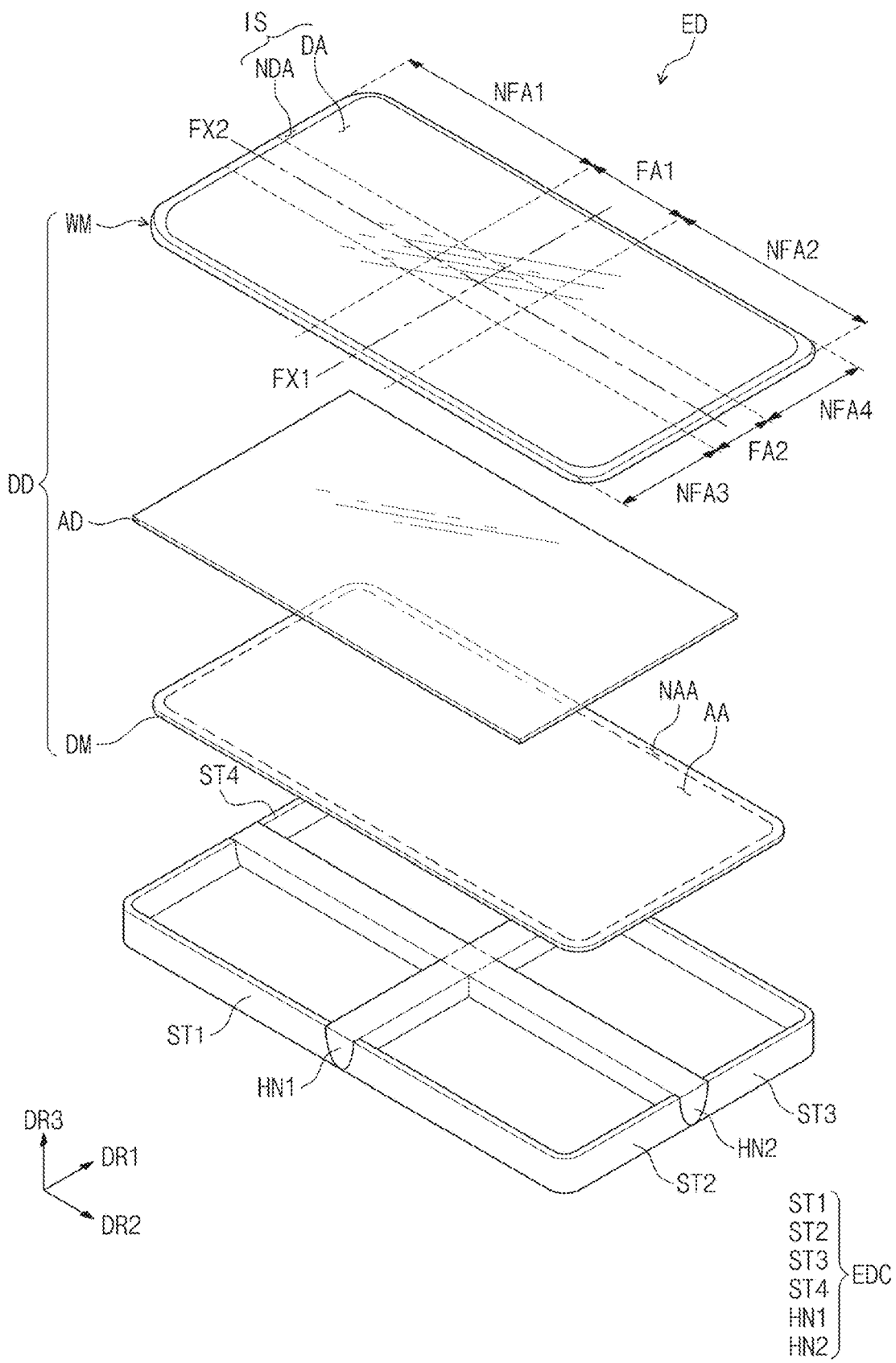
FIG. 3A is an exploded perspective view of an embodiment of an electronic device according to the invention.
Figure 3B:
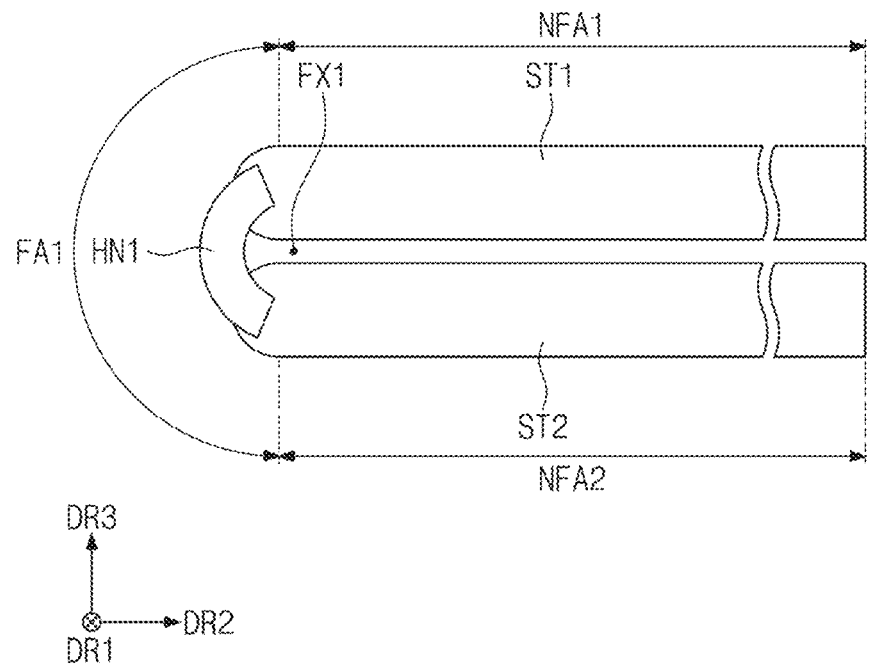
FIG. 3B and FIG. 3C are cross-sectional views illustrating an embodiment of the state in which an electronic device is folded according to the invention.
Figure 3C:
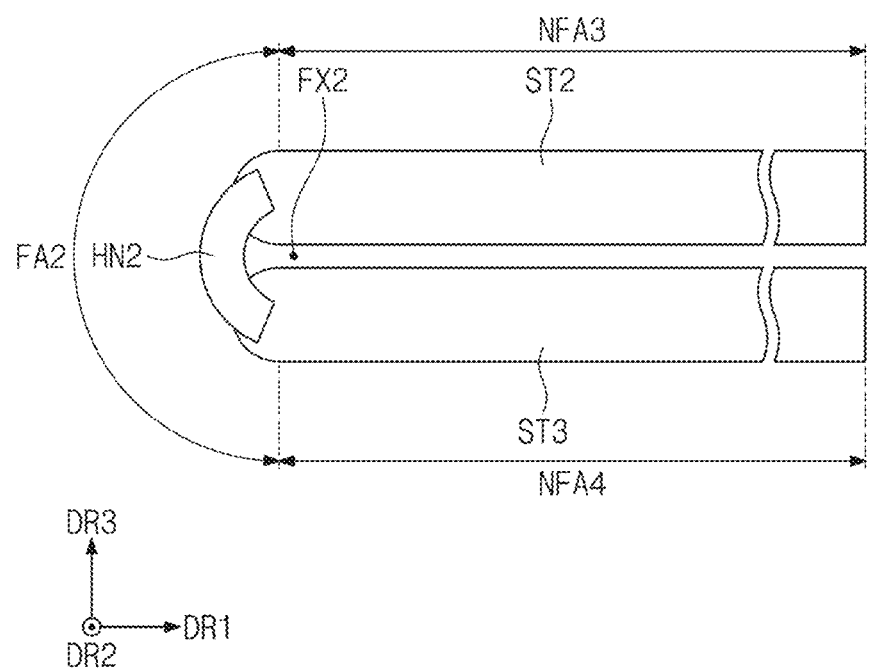

FIG. 3A is an exploded perspective view of an embodiment of an electronic device according to the invention. FIG. 3B and FIG. 3C are cross-sectional views illustrating an embodiment of the state in which an electronic device is folded according to the invention.

Referring FIG. 3A to FIG. 3C, the electronic device ED may include a display device DD and a housing EDC which receives the display device DD.

The display device DD may include a display module DM, a window module WM, and adhesive layer AD.

The display module DM may display an image in accordance with an electrical signal, and may transmit and receive information on an external input. The display module DM may include an active region AA and a peripheral region NAA.

The active region AA may be defined as a region activated in accordance with an electrical signal. In an embodiment, the display module DM may emit an image through the active region AA, or may sense various types of external inputs, for example. The active region AA may correspond to at least a portion of the display region DA.

The peripheral region NAA may be adjacent to the active region AA. In an embodiment, the peripheral region NAA may surround the active region AA, for example. However, this is only exemplary, and the peripheral region NAA may be adjacent to one side of the active region AA, or may be omitted. The peripheral region NAA may correspond to at least a portion of the non-display region NDA.

Although not separately illustrated, the display module DM may include a display panel. The display panel may generate an image emitted from the display module DM. The display panel may be a light-emitting-type display panel, but is not particularly limited thereto. In an embodiment, the display panel may be an organic light-emitting display panel or a quantum dot light-emitting display panel, for example. The display module DM may further include an input sensor disposed on the display panel and sense external inputs.

The display module DM may include a plurality of pixels disposed in the active region AA and a circuit unit disposed on the peripheral region NAA. The circuit unit may provide an electrical signal to the pixels to drive the pixels. The pixels may be arranged while forming light-emitting patterns in the active region AA. A light-emitting pattern of a pixel to which an electrical signal is applied from the circuit unit may emit light in correspondence to the electrical signal, through which an image may be output in the active region AA.

The window module WM may be disposed on the display module DM. The window module WM may cover the entire upper surface of the display module DM. The shape of the window module WM may correspond to the shape of the display module DM. The window module WM may mitigate an external impact, thereby preventing the display module DM from being damaged or malfunctioning due to the external impact.

The window module WM may include an optically transparent material. The window module WM may include an optically transparent substrate to be described later. In an embodiment, the window module WM may include a glass substrate, and the glass substrate may be a chemically reinforced tempered glass substrate, for example.

The window module WM may have a single-layered structure or a multi-layered structure. In an embodiment, the window module WM may have a single-layered structure including a glass substrate, but is not limited to, and may have a multi-layered structure including a coating film coated on a glass substrate, a filling member, or a polymer film disposed on the glass substrate, for example.

The front surface of the window module WM may correspond to the front surface of the display device DD. In addition, the front surface of the window module WM may correspond to the display surface IS of the electronic device ED described above. The window module WM may include the display region DA and the non-display region NDA described above.

The display region DA of the window module WM may transmit an image emitted by the display module DM. A user may visually recognize an image through the display region DA of the window module WM. The window module WM may have a predetermined color by overlapping the non-display region NDA. In an embodiment, the window module WM may further include a print layer formed or disposed on a glass substrate by overlapping the non-display region NDA, for example.

The window module WM may be flexible. The window module WM may be folded together with the display module DM about the first folding axis FX1 or the second folding axis FX2.

The window module WM in an embodiment may include a first folding region FA1 bent to have a predetermined curvature when folded about the first folding axis FX1, and a plurality of non-folding regions NFA1 and NFA2 adjacent to the first folding region FA1. The window module WM in an embodiment may include a second folding region FA2 bent to have a predetermined curvature when folded about the second folding axis FX2, and a plurality of non-folding regions NFA3 and NFA4 adjacent to the second folding region FA2.

In FIG. 3, the window module WM is illustrated in a quadrangular shape including rounded corners. However, this is only illustrative, and the window module WM may have various shapes in correspondence to the display module DM. The shape of the window module WM may vary depending on the design of a substrate manufactured through a manufacturing process of the window module WM.

The adhesive layer AD may be disposed between the window module WM and the display module DM. The adhesive layer AD may adhere the window module WM and the display module DM. In an embodiment, the adhesive layer AD may be an optically clear adhesive film ("OCA"), an optically clear adhesive resin layer ("OCR"), or a pressure sensitive adhesive ("PSA"). The adhesive layer AD may be formed or provided as one body with a filling member of the window module WM to be described later, but is not limited to any particular embodiment. In an embodiment, the adhesive layer AD may be omitted.

Although not separated illustrated, the display device DD may further include at least one functional layer disposed between the display module DM and the window module WM. In an embodiment, the display device DD may further include a refection prevention layer which reduces the reflectance of external light incident from above the window module WM, for example. In addition, the display device DD may further include at least one of a protective layer, a cushion layer, or a support module disposed below the display module DM.

The electronic device ED may include a housing EDC which receives the display device DD. The housing EDC may be coupled to the window module WM.

The housing EDC may include a first hinge HN1 folded or bent based on the first folding axis FX1, a second hinge HN2 folded or bent based on the second folding axis FX2, and a plurality of cases ST1, ST2, ST3, and ST4. The plurality of cases ST1, ST2, ST3, and ST4 may be coupled to each other through the first hinge HN1 and the second hinge HN2.

During folding and unfolding operations of the electronic device ED, the electronic device ED may perform the folding and unfolding operations based on each of the first hinge HN1 and the second hinge HN2.

The plurality of cases ST1, ST2, ST3, and ST4 may include a first case ST1 simultaneously overlapping a first non-folding region NFA1 and a third non-folding region NFA3, a second case ST2 simultaneously overlapping a second non-folding region NFA2 and the third non-folding region NFA3, a third case ST3 simultaneously overlapping the second non-folding region NFA2 and a fourth non-folding region NFA4, and a fourth case ST4 simultaneously overlapping the first non-folding region NFA1 and the fourth non-folding region NFA4.

Referring to FIG. 3B, the electronic device ED in an embodiment may be folded based on the first folding axis FX1 by the first hinge HN1. At this time, the first case ST1 and the second case ST2 may face each other. In an embodiment, the first case ST1 and the second case ST2 are illustrated as being spaced apart from each other, but the invention is not limited thereto, and at least a portion of the first case ST1 may contact the second case ST2. Although not illustrated, as the first hinge HN1 is folded, the third case ST3 and the fourth case ST4 may face each other.

Referring to FIG. 3C, the electronic device ED in an embodiment may be folded based on the second folding axis FX2 by the second hinge HN2. At this time, the second case ST2 and the third case ST3 may face each other. In an embodiment, the second case ST2 and the third case ST3 are illustrated as being spaced apart from each other, but the invention is not limited thereto, and at least a portion of the second case ST2 may contact the third case ST3. Although not illustrated, as the second hinge HN2 is folded, the first case ST1 may face the fourth case ST4.

The electronic device ED includes the first hinge HN1 and the second hinge NH2, and thus, may be folded based on each of the first folding axis FX1 and the second folding axis FX2.

Figure 4:
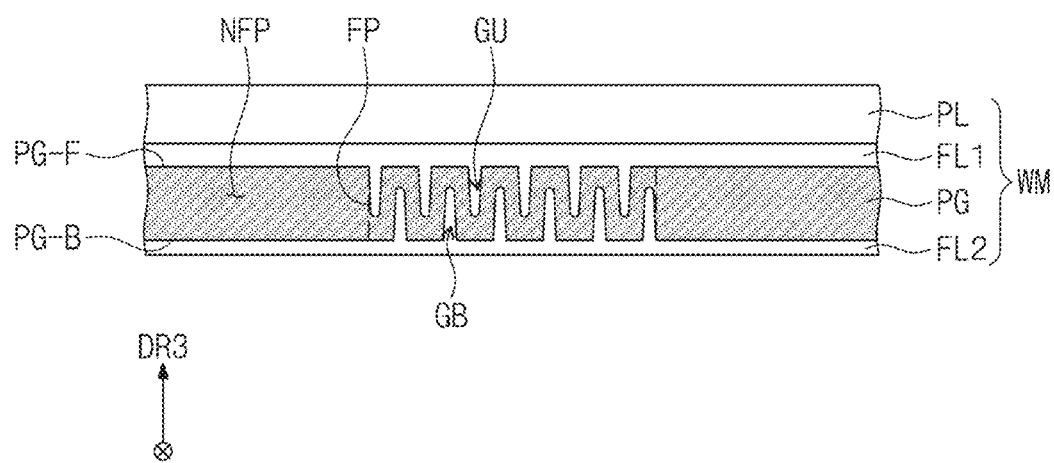
FIG. 4 is a cross-sectional view of an embodiment of a window module according to the invention.

FIG. 4 is a cross-sectional view of an embodiment of a window module according to the invention. FIG. 4 is a cross-sectional view of an embodiment in which the window module WM is cut in one direction.

Referring to FIG. 4, the window module WM may include a window PG and a window protection layer PL. The window module WM in an embodiment may further include a first filling layer FL1 disposed on an upper portion of the window PF and a second filling layer FL2 disposed on a lower portion of the window PG.

The window PG may include an optically transparent material. In an embodiment, the window PG may include a glass substrate, and the glass substrate may be a chemically reinforced tempered glass substrate, for example. By including a glass substrate, the window PG may have excellent aesthetics, and may be prevented from being imprinted or scratched by a sharp material.

The window PG may include an upper surface PG-F and a lower surface PG-B opposite to each other. In an embodiment, the upper surface PG-F and the lower surface PG-B may face each other in the third direction DR3. The window PG may have a predetermined thickness along the third direction DR3. The thickness of the window PG may affect the impact resistance of the window PG. When the window PG is too thin, the window PG may be broken or damaged by an impact focused on a local region (e.g., an impact by a pen drop). When the window PG is too thick, the flexibility thereof may be degraded or the window PG may be broken when folded. In an embodiment, the thickness of the window PG may be about 100 micrometers (µm), for example. In an embodiment, the thickness of the window PG may be about 100 µm to about 1000 µm. In an embodiment, the thickness of the window PG may be about 300 µm to about 700 µm. However, the thickness of the window PG is not necessarily limited to the above numerical value examples. When the thickness of the window PG satisfies the above range, the impact resistance of the window PG is ensured, so that the display module DM to be disposed below the window PG may be protected from external impacts.

The window PG may include a folding portion FP and a peripheral portion NFP defined in one direction. The folding portion FP may be a portion folded about any one of the first folding axis FX1 and the second folding axis FX2 described above in one direction.

The peripheral portion NFP may be a portion adjacent to the folding portion FP. The peripheral portion NFP may be a portion not folded in the one direction.

An upper groove having a recessed shape in the upper surface PG-F and a lower groove GB having a recessed shape in the lower surface PG-B may be defined in the folding portion FP.

FIG. 4 illustrates six upper grooves GU and six lower grooves GB recessed along the third direction DR3 in the folding portion FP. However, the number of each of the upper groove GU and the lower groove GB is not limited to what is illustrated, and one or more, five or less, or seven or more of each of the upper groove GU and the lower groove GB may be defined.

The peripheral portion NFP may be a portion adjacent to the folding portion FP. The upper groove GU and the lower groove GB may not be defined in the peripheral portion NFP.

The upper groove GU and the lower groove GB are defined in the folding portion FP, and thus, may have improved folding properties compared to the peripheral portion NFP. Specifically, the upper groove GU and the lower groove GB are defined in the folding portion FP, and thus, the folding portion FP may be relatively thinner than the peripheral portion NFP, and may have improved flexibility. Accordingly, the stress applied to the window PG when the electronic device ED is folded may be reduced, and the damage caused by the folding of the window PG may be prevented.

However, the definition of the folding portion FP and the peripheral portion NFP may be relative to a folding direction. The window PG of the invention may be folded about each of the first folding axis FX1 and the second folding axis FX2. A folding portion FP and a peripheral portion NFP defined when the window PG is folded about the first folding axis FX1 may be different from a folding portion FP and a peripheral portion NFP defined when the window PG is folded about the second folding axis FX2.

When the window module WM is cut in a different direction from the cutting direction of the window module WM illustrated in FIG. 4, the upper groove GU and the lower groove GB may also be defined in the peripheral portion NFP of the window PG illustrated in FIG. 4, and a portion of the peripheral portion NFP may be folded in the different direction. The folding portion FP and the peripheral portion NFP will be described in detail later.

The first and second filling layers FL1 and FL2 may be respectively disposed in the upper portion and the lower portion of the window PG. The first and second filling layers FL1 and FL2 may respectively overlap the folding portion FP and the peripheral portion NFP of the window PG. In an embodiment, the upper groove GU and the lower groove GB may be filled by the first and second filling layers FL1 and FL2. In an alternative embodiment, optionally, the first and second filling layers FL1 and FL2 may be provided only to the folding portion FP to fill the upper groove GU and the lower groove GB.

An upper surface of the first filling layer FL1 may be a flat surface, and a lower surface of the second filling layer FL2 may be a flat surface.

The first and second filling layers FL1 and FL2 may include a synthetic resin material. The first and second filling layers FL1 and FL2 of an example may include a material having the same refractive index as that of the window PG. In an embodiment, the first and second filling layers FL1 and FL2 may include at least one of a urethane-based resin, an epoxy-based resin, a polyester-based resin, a polyether-based resin, an acrylate-based resin, an acrylonitrile-butadiene-styrene("ABS") resin, or rubber, for example. Specifically, each of the filling layers FL1 and FL2 may include at least one of phenylene, polyethyleneterephthalate ("PET"), polyimide ("PI"), polyamide ("PAI"), polyethylene naphthalate ("PEN"), or polycarbonate ("PC").

The window protection layer PL may be disposed on the window PG. The window protection layer PL may be provided on the first filling layer FL1. The window protection layer PL may perform a function of protecting the window PG from external impacts.

The window protection layer PL may include a synthetic resin material. In an embodiment of the invention, the window protection layer PL may include at least one of a urethane-based resin, an epoxy-based resin, a polyester-based resin, a polyether-based resin, an acrylate-based resin, an ABS resin, or rubber. Specifically, the window protection layer PL may include at least one of phenylene, PET, PI, PAI, PEN, or PC.

The window protection layer PL may have a single-layered structure or a multi-layered structure. In an embodiment, the window protection layer PL may have a single-layered structure including a synthetic resin material, but is not limited thereto, and may have a multi-layered structure further including at least one of a hard coating layer, an anti-fingerprint layer, or an anti-fouling layer in addition to a layer including a synthetic resin material, for example.

Figure 5A:
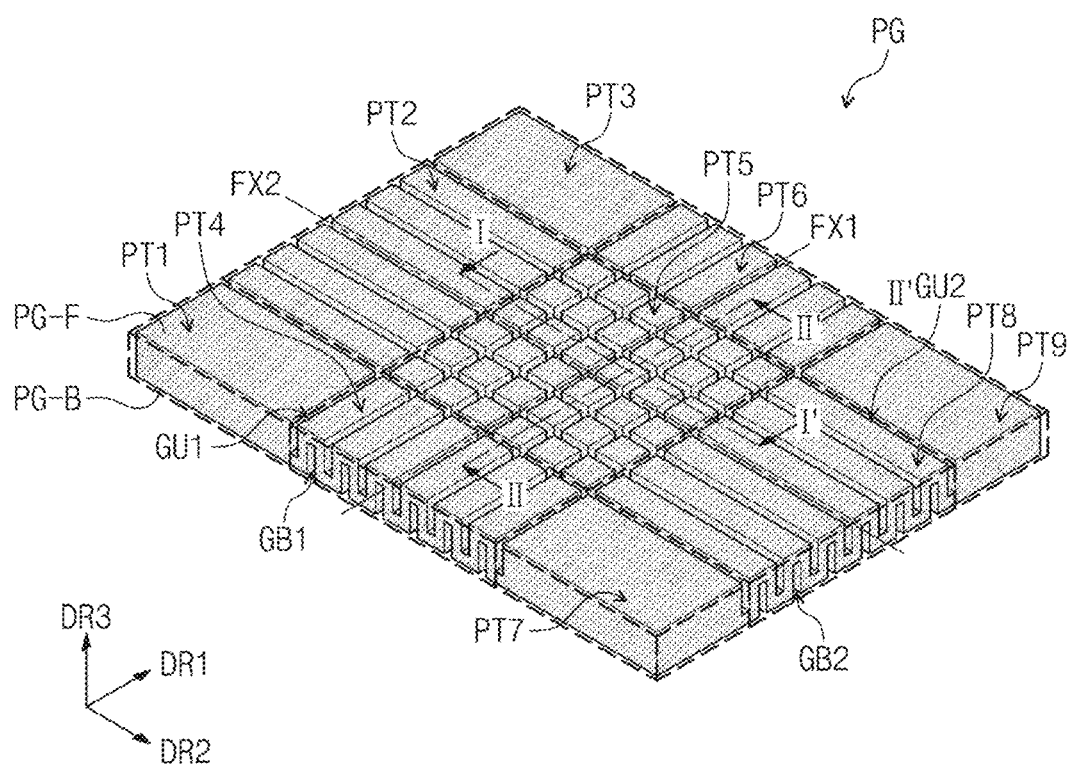
FIG. 5A is a perspective view of an embodiment of a window according to the invention.

FIG. 5A is a perspective view of an embodiment of a window according to the invention.

Referring to FIG. 5A, the window PG in an embodiment may have a cuboid shape including the upper surface PG-F and the lower surface PG-B respectively parallel to the first direction DR1 and the second direction DR2, and having a thickness defined along the third direction DR3. FIG. 5A illustrates the window PF having right-angled corners. However, the invention is not limited thereto, and the window PG of FIG. 5A may have a cuboid shape with rounded corners.

The window PG of the invention is folded about the first folding axis FX1 extended in the first direction DR1, and is folded about the second folding axis FX2 extended in the second direction DR2.

In an embodiment, FIG. 5A illustrates a case in which the first and second folding axes FX1 and FX2 are disposed on the upper surface PG-F of the window PG. When the electronic device ED is folded, the upper surface PG-F may be folded while surrounding the first folding axis FX1 or the second folding axis FX2. However, the embodiment of the invention is not necessarily limited thereto, and the first and second folding axes FX1 and FX2 may be disposed below the lower surface PG-B of the window PG. In this case, when the electronic device ED is folded, the lower surface PG-B of the window PG may be folded while surrounding the first folding axis FX1 or the second folding axis FX2.

The window PG includes a first portion PT1, a second portion PT2, a third portion PT3, a fourth portion PT4, a fifth portion PT5, a sixth portion PT6, a seventh portion PT7, an eighth portion PT8, and a ninth portion PT9. The first portion PT1, the second portion PT2, and the third portion PT3 are sequentially defined in the first direction DR1. The fourth portion PT4, the fifth portion PT5, and the sixth portion PT6 are sequentially defined in the first direction DR1. The fourth portion PT4, the fifth portion PT5, and the sixth portion PT6 respectively overlap the first portion PT1, the second portion PT2, and the third portion PT3 in the second direction DR2.

The seventh portion PT7, the eighth portion PT8, and the ninth portion PT9 are sequentially defined in the first direction DR1. The seventh portion PT7, the eighth portion PT8, and the ninth portion PT9 respectively overlap the fourth portion PT4, the fifth portion PT5, and the sixth portion PT6 in the second direction DR2. The seventh portion PT7, the eighth portion PT8, and the ninth portion PT9 may respectively overlap the first portion PT1, the second portion PT2, and the third portion PT3 in the second direction DR2.

In the second direction DR2, the fourth portion PT4, the fifth portion PT5, and the sixth portion PT6 are respectively disposed below the first portion PT1, the second portion PT2, and the third portion PT3. In the second direction DR2, the seventh portion PT7, the eighth portion PT8, and the ninth portion PT9 are respectively disposed below the fourth portion PT4, the fifth portion PT5, and the sixth portion PT6.

The first to ninth portions PT1, PT2, PT3, PT4, PT5, PT6, PT7, PT8, and PT9 may be disposed on the same plane. Specifically, an upper surface of each of the first to ninth portions PT1, PT2, PT3, PT4, PT5, PT6, PT7, PT8, and PT9 together may define a surface of a single plane. In an embodiment, the upper surface of each of the first to ninth portions PT1, PT2, PT3, PT4, PT5, PT6, PT7, PT8, and PT9 together may define a first surface of a single plane, for example. The first surface may correspond to the upper surface PG-F of the window PG.

Specifically, a lower surface of each of the first to ninth portions PT1, PT2, PT3, PT4, PT5, PT6, PT7, PT8, and PT9 together may define a surface of a single plane. In an embodiment, the lower surface of each of the first to ninth portions PT1, PT2, PT3, PT4, PT5, PT6, PT7, PT8, and PT9 together may define a second surface of a single plane, for example. The second surface may correspond to the lower surface PG-B the window PG.

The upper groove GU (refer to FIG. 4) and the lower groove GB (refer to FIG. 4) are defined in the window PG. The upper groove GU (refer to FIG. 4) may include a first upper grooves GU1 and a second upper grooves GU2. The lower groove GB (refer to FIG. 4) may include a first lower grooves GB1 and a second lower grooves GB2.

Each of the first upper grooves GU1 and the second upper grooves GU2 has a shape recessed in the upper surface PG-F. Each of the first upper grooves GU1 is extended in the first direction DR1. Each of the second upper grooves GU2 is extended in the second direction DR2.

The first upper groove GU1 may be spaced apart in the second direction DR2, and the second upper grooves GU2 may be spaced apart in the first direction DR1.

Each of the first lower grooves GB1 and the second lower grooves GB2 has a shape recessed in the lower surface PG-B. Each of the first lower grooves GB1 is extended in the first direction DR1. Each of the second lower grooves GB2 is extended in the second direction DR2.

The first lower grooves GB1 may be spaced apart in the second direction DR2, and the second lower grooves GB2 may be spaced apart in the first direction DR1.

Specifically, the first upper grooves GU1 and the first lower grooves GB1 are defined in each of the fourth to sixth portions PT4, PT5, and PT6. Accordingly, each of the fourth portion PT4, the fifth portion PT5, and the sixth portion PT6 may be folded about the first folding axis FX1 parallel to the first direction DR1. Based on the first folding axis FX1, the fourth portion PT4, the fifth portion PT5, and the sixth portion PT6 may correspond to the folding portion FP described above with reference to FIG. 4. The first portion PT1, the second portion PT2, the third portion PT3, the seventh portion PT7, the eighth portion PT8, and the ninth portion PT9 may correspond to the peripheral portion NFP described above with reference to FIG. 4.

The second upper grooves GU2 and the second lower grooves GB2 are defined in each of the second portion PT2, the fifth portion PT5, and the eighth portion PT8. Accordingly, each of the second portion PT2, the fifth portion PT5, and the eighth portion PT8 may be folded about the second folding axis FX2 parallel to the second direction DR2. Based on the second folding axis FX2, the second portion PT2, the fifth portion PT5, and the eighth portion PT8 may correspond to the folding portion FP described above with reference to FIG. 4. The first portion PT1, the third portion PT3, the fourth portion PT4, the sixth portion PT6, the seventh portion PT7, and the ninth portion PT9 may correspond to the peripheral portion NFP described above with reference to FIG. 4.

The fifth portion PT5 may be folded about the first folding axis FX1, and about the second folding axis FX2.

The first upper grooves GU1, the first lower grooves GB1, the second upper grooves GU2, and the second lower grooves GB2 are defined in the window PG of the invention, and thus, the window PG of the invention may have improved folding properties. Specifically, the window PG of the invention may be folded about the first folding axis FX1 by the first upper grooves GU1 and the first lower grooves GB1, and may be folded about the second folding axis FX2 by the second upper grooves GU2 and the second lower grooves GB2.

Figure 5B:
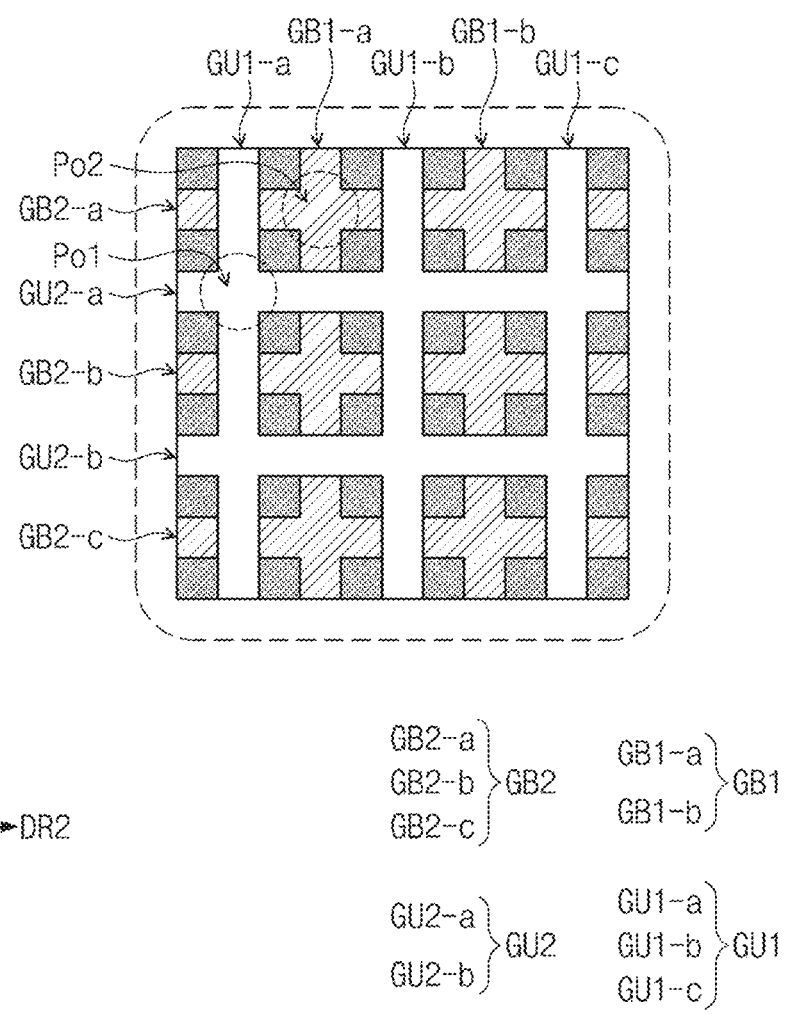
FIG. 5B is a plan view of an enlarged portion of an embodiment of a window according to the invention.

FIG. 5B is a plan view of an embodiment of an enlarged portion of a window according to the invention.

FIG. 5B is a plan view of an embodiment in which a portion of the fifth portion PT5 of FIG. 5A is enlarged.

Referring to FIG. 5B, the first upper grooves GU1, the first lower grooves GB1, the second upper grooves GU2, and the second lower grooves GB2 are defined in the fifth portion PT5.

In a plan view, the first upper grooves GU1 and the second upper grooves GU2 may be defined on a front surface of the window PG, and the first lower grooves GB1 and the second lower grooves GB2 may be defined on a rear surface of the window PG. The first lower grooves GB1 and the second lower grooves GB2 defined on the rear surface are marked with hatching. In an embodiment, in FIG. 5B, three first upper grooves GU1-a, GU1-b, and GU1-c, two first lower grooves GB1-a and GB1-b, two second upper grooves GU2-a and GU2-b, and three second lower grooves GB2-a, GB2-b, and GB2-c are illustrated, but the number of each groove is not limited thereto.

Each of the first upper grooves GU1 and the first lower grooves GB1 is extended in the first direction DR1. Each of the second upper grooves GU2 and the second lower grooves GB2 is extended in the second direction DR1.

In a plan view, the first upper grooves GU1 may cross the second upper grooves GU2. In an embodiment, the first upper groove GU1-a may cross the second upper groove GU2-a at a first point Po1, for example.

In the same manner, in a plan view, the first lower grooves GB1 may cross the second lower grooves GB2. In an embodiment, the first lower groove GB1-a may cross the second upper groove GU2-a at a second point Po2, for example.

In the window PG of the invention, at the fifth portion PT5, the first upper grooves GU1 and the second upper grooves GU2 may cross each other, and the first lower grooves GB1 and the second lower grooves GB2 may cross each other. The fifth portion PT5 may be defined as a crossing portion.

Figure 5D:
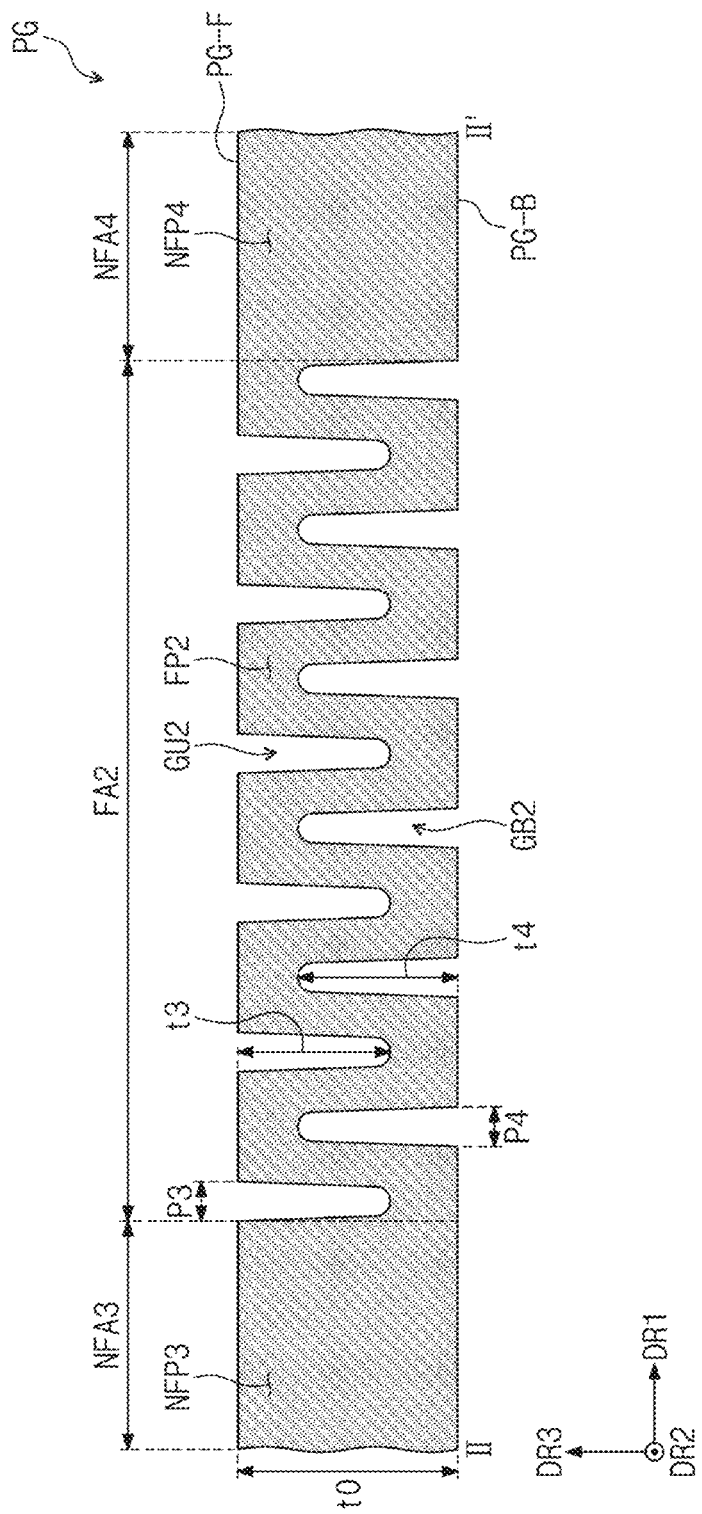
Figure 5E:
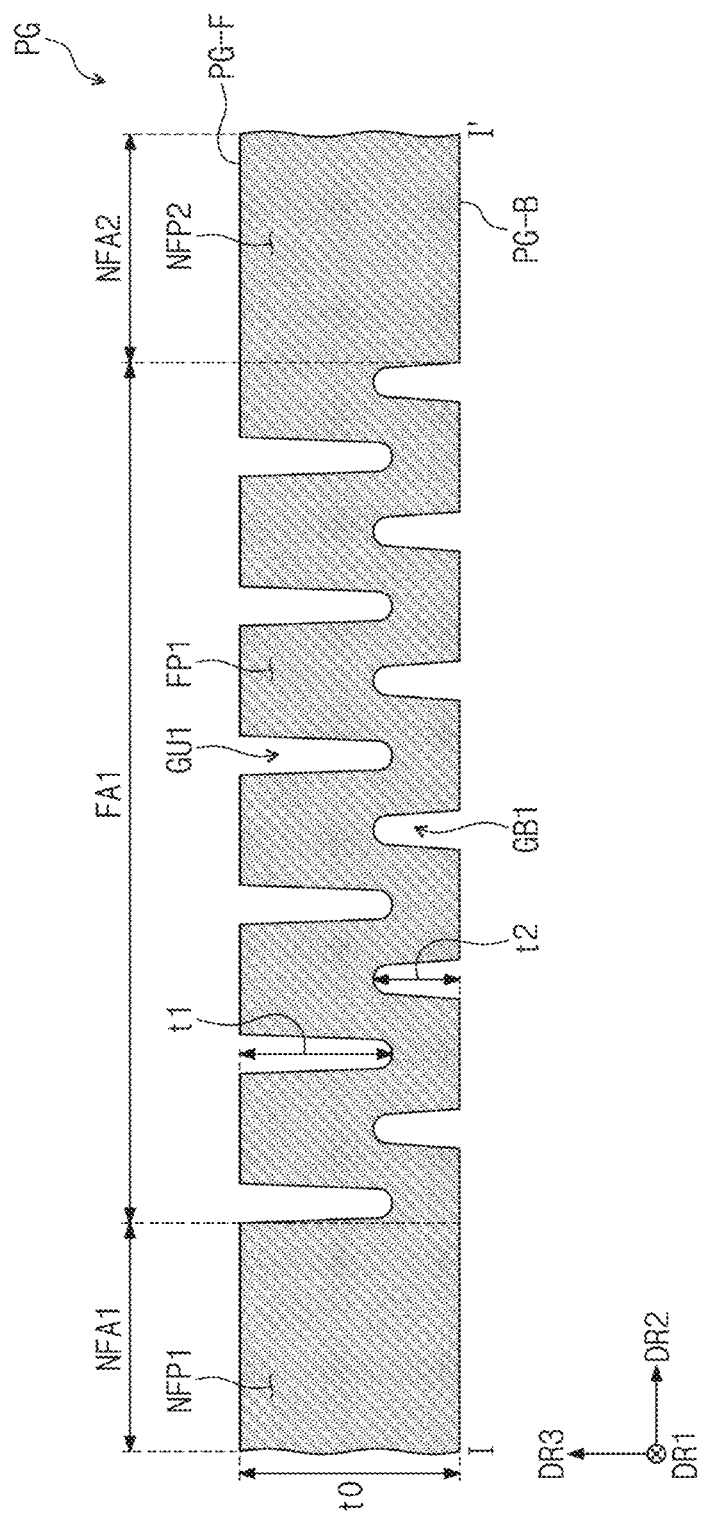

FIG. 5C to FIG. 5E are cross-sectional views illustrating an embodiment of a portion of a cross-section of a window according to the invention.

FIG. 5C is a cross-sectional view of taken along line I-I' illustrated in FIG. 5A. The cutting line I-I' of FIG. 5A may be parallel to the second direction DR2.

Referring to FIG. 5A and FIG. 5C together, the window PG of the invention may include a first folding portion FP1 folded about the first folding axis FX1 and a first peripheral portion NFP1 and a second peripheral portion NFP2 which are adjacent to the first folding portion FP1. The first peripheral portion NFP1 and the second peripheral portion NFP2 may be spaced apart from each other in the second direction DR2 with the first folding portion FP1 interposed therebetween.

The fourth to sixth portions PT4, PT5, and PT6 may correspond to the first folding portion FP1. The first to third portions PT1, PT2, and PT3 may correspond to the first peripheral portion NFP1. The seventh to ninth portions PT7, PT8, and PT9 may correspond to the second peripheral portion NFP2.

Based on the first folding axis FX1, the first folding portion FP1 may be defined as the first folding region FA1, and the first peripheral portion NFP1 and the second peripheral portion NFP2 may be respectively defined as the first and second non-folding regions NFA1 and NFA2.

In the first folding portion FP1, the first upper groove GU1 and the first lower groove GB1 may be defined.

In an embodiment, the first upper groove GU1 and the first lower groove GB1 may not overlap each other in a plan view. In the second direction DR2, the first upper groove GU1 and the first lower groove GB1 may have a shape of being alternately defined.

Each of the first upper grooves GU1 has a shape of being recessed in the upper surface PG-F, and may have, specifically, a shape of being recessed in a direction from the upper surface PG-F to the lower surface PG-B. A height t1 of the first upper grooves GU1 may be defined as an average value of maximum values of depths at which each of the first upper grooves GU1 is recessed in the direction from the upper surface PG-F to the lower surface PG-B. Here, the maximum values of the depths may mean depths measured from the upper surface PG-F to respective points of the first upper grooves GU1 farthest from the upper surface PG-F in the third direction DR3.

In an embodiment, when the thickness of the window PG is set to t0, the height t1 of the first upper grooves GU1 may be set to a value of "greater than 0 μm to (t0-100) μm or less." That is, the minimum value of thicknesses from the lower surface PG-B of the window PG to the first upper grooves GU1 may be about 100 μm.

In an embodiment, when the thickness t0 of the window PG is about 300 μm, the height t1 of the first upper grooves GU1 may be set to a value of greater than 0 μm to 200 μm or less, for example. In an embodiment, when the thickness t0 of the window PG is about 700 μm, the height t1 of the first upper grooves GU1 may be set to a value of greater than 0 μm to 600 μm or less, for example.

Each of the first lower grooves GB1 has a shape of being recessed in the lower surface PG-B, and may have, specifically, a shape of being recessed in a direction from the lower surface PG-B to the upper surface PG-F. A height t2 of the first lower grooves GB1 may be defined as an average value of maximum values of depths at which each of the first lower grooves GB1 is recessed in the direction from the lower surface PG-B to the upper surface PG-F.

In an embodiment, when the thickness of the window PG is set to t0, the height t2 of the first lower grooves GB1 may be set to a value of "greater than 0 μm to (t0-100) μm or less." That is, the minimum value of thicknesses from the upper surface PG-F of the window PG to the first lower grooves GB1 may be about 100 μm.

In an embodiment, when the thickness t0 of the window PG is about 300 μm, the height t2 of the first lower grooves GB1 may be set to a value of greater than 0 μm to 200 μm or less, for example. In an embodiment, when the thickness t0 of the window PG is about 700 μm, the height t2 of the first lower grooves GB1 may be set to a value of greater than 0 μm to 600 μm or less, for example.

However, the height t1 of the first upper grooves GU1 and the height t2 of the first lower grooves GB1 are not necessarily limited to the above numerical value examples.

In an embodiment as illustrated in FIG. 5B, the height t1 of the first upper grooves GU1 may substantially be the same as the height t2 of the first lower grooves GB1. However, the invention is not limited thereto.

A portion of the window PG overlapping the first upper grooves GU1 and the first lower grooves GB1 is relatively thin, so that the folding properties of the window PG may be improved, and a portion of the window PG not overlapping the first upper grooves GU1 and the first lower grooves GB1 is relatively thick, so that the impact resistance of the window PG may be improved.

A width P1 of the first upper grooves GU1 may be defined as an average value of the widths of the first upper grooves GU1 measured in the second direction DR2 on the upper surface PG-F. In an embodiment, each of the widths of the first upper grooves GU1 may gradually decrease as farther from the upper surface PG-F, and therefore the widths of the first upper grooves GU1 measured in the second direction DR2 on the upper surface PG-may be maximum values, but the invention is not limited thereto.

A width P2 of the first lower grooves GB1 may be defined as an average value of the widths of the first lower grooves GB1 measured in the second direction DR2 on the lower surface PG-B.

The width P1 of the first upper grooves GU1 and the width P2 of the first lower grooves GB1 may each be set to a value of about 80 μm to about 200 μm. In an embodiment, the width P1 of the first upper grooves GU1 and the width P2 of the first lower grooves GB1 may each be set to a value of about 100 μm to about 120 μm, for example.

However, the width P1 of the first upper grooves GU1 and the width P2 of the first lower grooves GB1 are not necessarily limited to the above numerical value examples.

In an embodiment, the width P1 of the first upper grooves GU1 may be substantially the same as the width P2 of the first lower grooves GB1. However, the invention is not limited thereto.

In the disclosure, when the height, width, and the like are "substantially the same," it may include not only a case in which numerical values of the height, width, and the like are completely the same but also a case in which there is a difference within an error range that may occur during a process despite the same design.

FIG. 5D is a cross-sectional view of taken along line II-II' illustrated in FIG. 5A. The cutting line II-II' of FIG. 5A may be parallel to the first direction DR1.

Referring to FIG. 5A and FIG. 5D together, the window PG of the invention may include a second folding portion FP2 folded about the second folding axis FX2 and a third peripheral portion NFP3 and a fourth peripheral portion NFP4 which are adjacent to the second folding portion FP2. The third peripheral portion NFP3 and the fourth peripheral portion NFP4 may be spaced apart from each other in the first direction DR1 with the second folding portion FP2 interposed therebetween.

The second portion PT2, the fifth portion PT5, and the eighth portion PT8 may correspond to the second folding portion FP2. The first portion PT1, the fourth portion PT4, and the seventh portion PT7 may correspond to the third peripheral portion NFP3. The third portion PT3, the sixth portion PT6, and the ninth portion PT9 may correspond to the fourth peripheral portion NFP4.

Referring to FIG. 5A, FIG. 5C, and FIG. 5D together, a portion folded about the first folding axis FX1 and a portion folded about the second folding axis FX2 may be different from each other. In an embodiment, the second portion PT2 in the first peripheral portion NFP1 and the eighth portion PT8 in the second peripheral portion NFP2 may correspond to the second folding portion FP2, for example. In addition, in the first folding portion FP1, the fourth portion PT4 and the sixth portion PT6 may respectively correspond to the third peripheral portion NFP3 and the fourth peripheral portion NFP4.

Based on the second folding axis FX2, the second folding portion FP2 may be defined as the second folding region FA2, and the third peripheral portion NFP3 and the fourth peripheral portion NFP4 may be respectively defined as the third and fourth non-folding regions NFA3 and NFA4.

In the second folding portion FP2, the second upper groove GU2 and the second lower groove GB2 may be defined.

In an embodiment, the second upper groove GU2 and the second lower groove GB2 may not overlap each other in a plan view. In the first direction DR1, the second upper groove GU2 and the second lower groove GB2 may have a shape of being alternately defined.

Each of the second upper grooves GU2 has a shape of being recessed in the upper surface PG-F, and may have, specifically, a shape of being recessed in a direction from the upper surface PG-F to the lower surface PG-B. A height t3 of the second upper grooves GU2 may be defined as an average value of maximum values of depths at which each of the second upper grooves GU2 is recessed in the direction from the upper surface PG-F to the lower surface PG-B.

The description of the height t1 of the first upper grooves GU1 described above may be equally applied to a detailed description of the height t3 of the second upper grooves GU2.

Each of the second lower grooves GB2 has a shape of being recessed in the lower surface PG-B, and may have, specifically, a shape of being recessed in a direction from the lower surface PG-B to the upper surface PG-F. A height t4 of the second lower grooves GB2 may be defined as an average value of maximum values of depths at which each of the second lower grooves GB2 is recessed in the direction from the lower surface PG-B to the upper surface PG-F.

The description of the height t2 of the first lower grooves GB1 described above may be equally applied to a detailed description of the height t4 of the second lower grooves GB2.

In an embodiment, the height t3 of the second upper grooves GU2 may be substantially the same as the height t4 of the second lower grooves GB2. However, the invention is not limited thereto.

A width P3 of the second upper grooves GU2 may be defined as an average value of the widths of the second upper grooves GU2 measured in the first direction DR1 on the upper surface PG-F. A width P4 of the second lower grooves GB2 may be defined as an average value of the widths of the second lower grooves GB2 measured in the second direction DR1 on the lower surface PG-B.

The description of the width P1 of the first upper grooves GU1 described above may be equally applied to a detailed description of the width P3 of the second upper grooves GU2. The description of the width P2 of the first lower grooves GB1 described above may be equally applied to a detailed description of the width P4 of the second lower grooves GB2.

In an embodiment, the width P3 of the second upper grooves GU2 may be substantially the same as the width P4 of the second lower grooves GB2. However, the invention is not limited thereto.

A window PG of FIG. 5E is an embodiment illustrated which is different from the window PG illustrated in FIG. 5D.

Referring to FIG. 5E, in an embodiment of the window PG, the height t1 of the first upper grooves GU1 may be different from the height t2 of the first lower grooves GB1. In an embodiment, the height t1 of the first upper grooves GU1 may be greater than the height t2 of the first lower grooves GB1, for example. Accordingly, the flexibility of the upper surface PG-F of the window PG may be further improved.

However, the invention is not limited thereto. Although not illustrated, the height t1 of the first upper grooves GU1 may be less than the height t2 of the first lower grooves GB1. Accordingly, the flexibility of the lower surface PG-B of the window PG may be further improved.

The shapes of the second upper grooves GU2 and the second lower grooves GB2 may also be changed like the shapes of the first upper grooves GU1 and the first lower grooves GB1. Hereinafter, the descriptions of the second upper grooves GU2 and the second lower grooves GB2 may be equally applied to descriptions of the first upper grooves GU1 and the first lower grooves GB1 to be described later, and embodiments of the second upper grooves GU2 and the second lower grooves GB2 will be omitted.

Figure 6A:
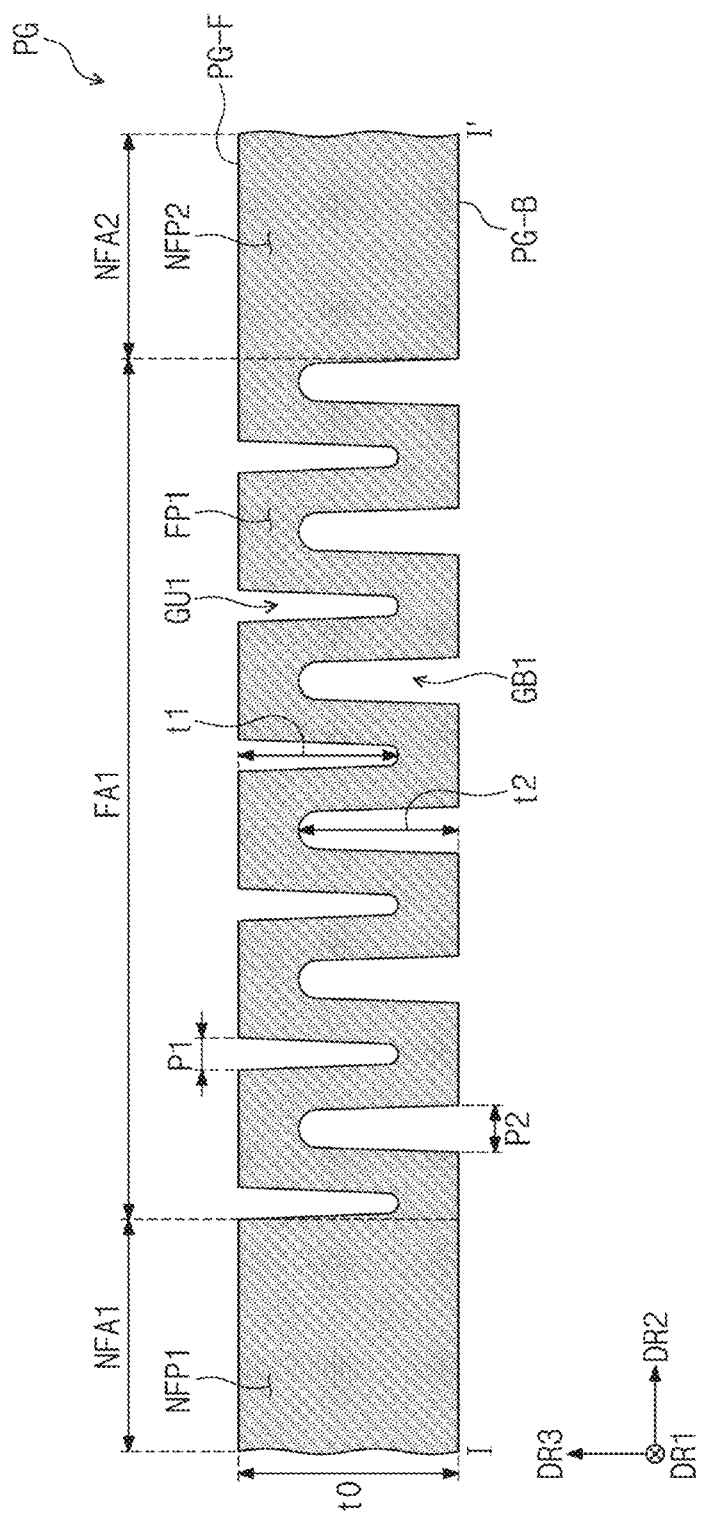
FIG. 6A and FIG. 6B are cross-sectional views illustrating an embodiment of a portion of a cross-section of a window according to the invention.
Figure 6B:
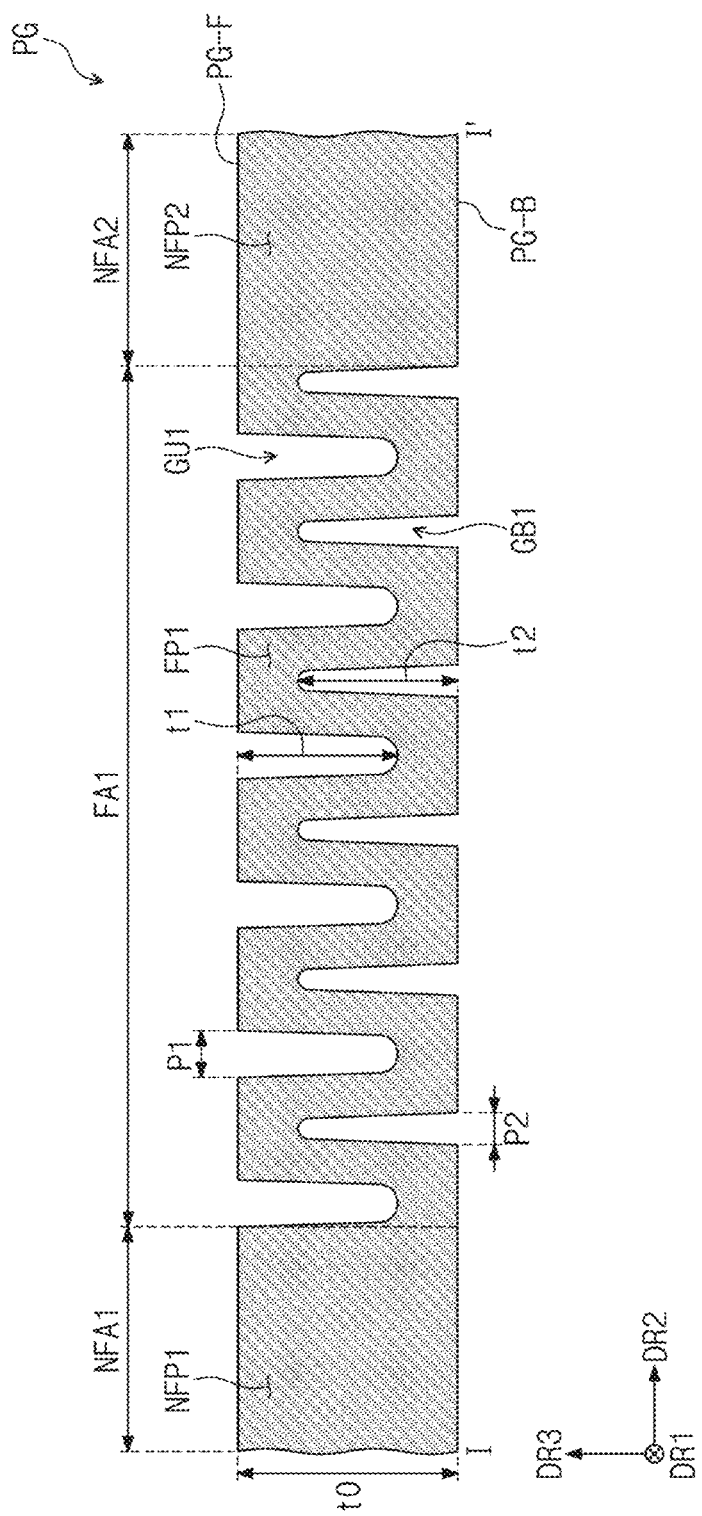

FIG. 6A and FIG. 6B are cross-sectional views illustrating an embodiment of a portion of a cross-section of a window according to the invention.

Referring to FIG. 6A, in an embodiment of the window PG, the width P1 of the first upper grooves GU1 may be different from the width P2 of the first lower grooves GB1. In an embodiment, the width P1 of the first upper grooves GU1 may be less than the width P2 of the first lower grooves GB1, for example. However, the invention is not limited thereto.

Referring to FIG. 6B, in an embodiment of the window PG, the width P1 of the first upper grooves GU1 may be different from the width P2 of the first lower grooves GB1. In an embodiment, the width P1 of the first upper grooves GU1 may be greater than the width P2 of the first lower grooves GB1, for example.

In FIG. 6A and FIG. 6B, the ratio of the width P1 of the first upper grooves GU1 and the width P2 of the first lower grooves GB1 is not particularly limited.

FIG. 6A and FIG. 6B illustrate a case in which the height t1 of the first upper grooves GU1 is the same as the height t2 of the first lower grooves GB1. However, the invention is not limited thereto, and in FIG. 6A and FIG. 6B, the height t1 of the first upper grooves GU1 may be changed to be different from the height t2 of the first lower grooves GB1. The contents described above with reference to FIG. 5A to FIG. 5E may be equally applied to descriptions of other components.

Figure 7A:
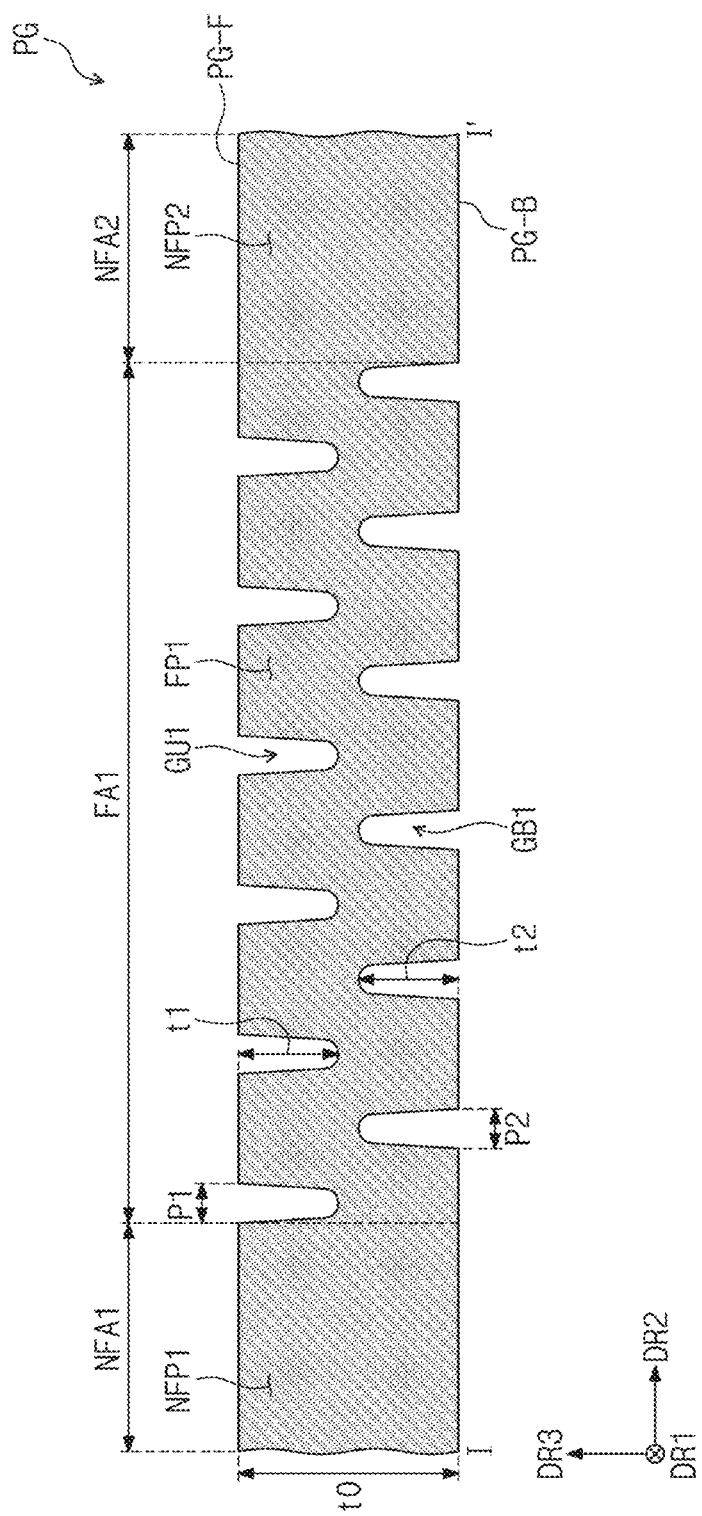
FIG. 7A to FIG. 7C are each a cross-sectional view illustrating an embodiment of a portion of a cross-section of a window according to the invention.
Figure 7B:
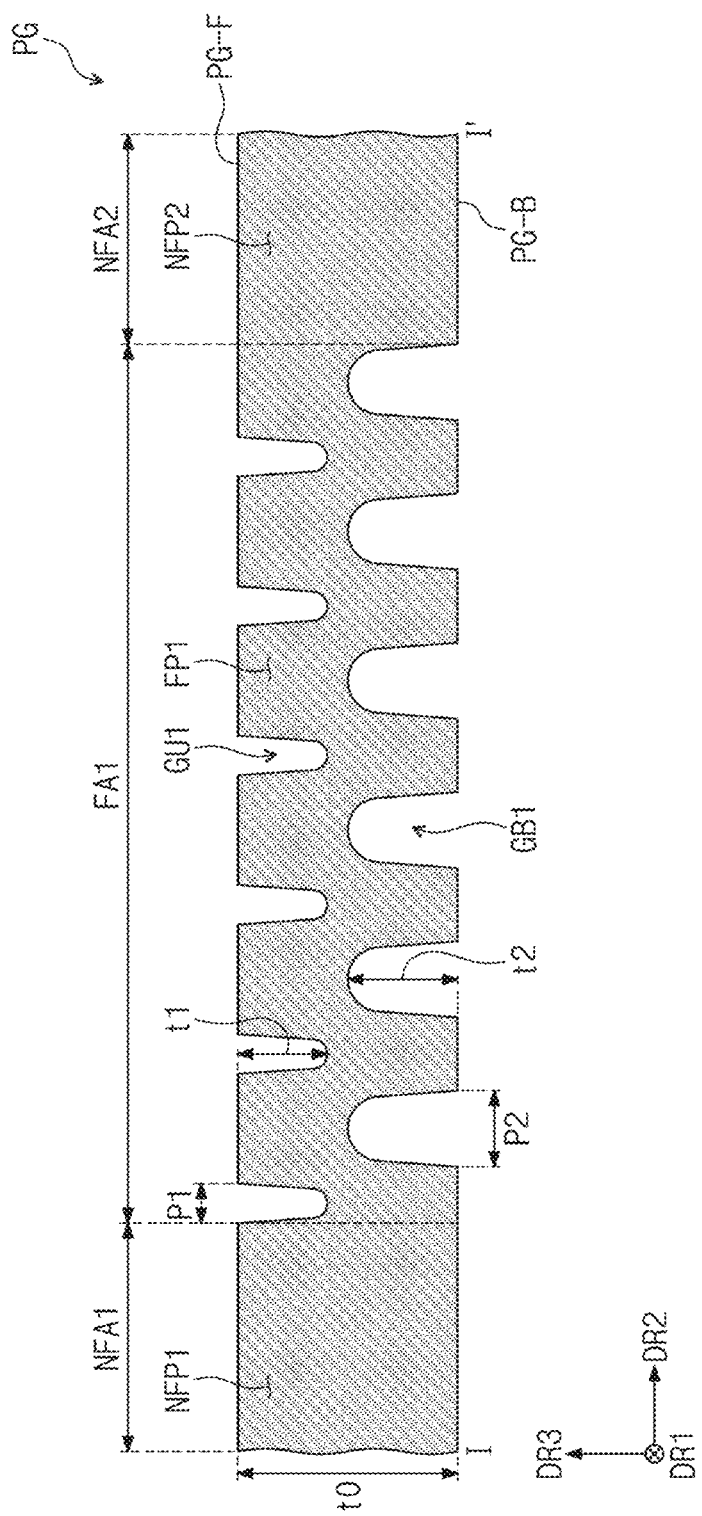
Figure 7C:
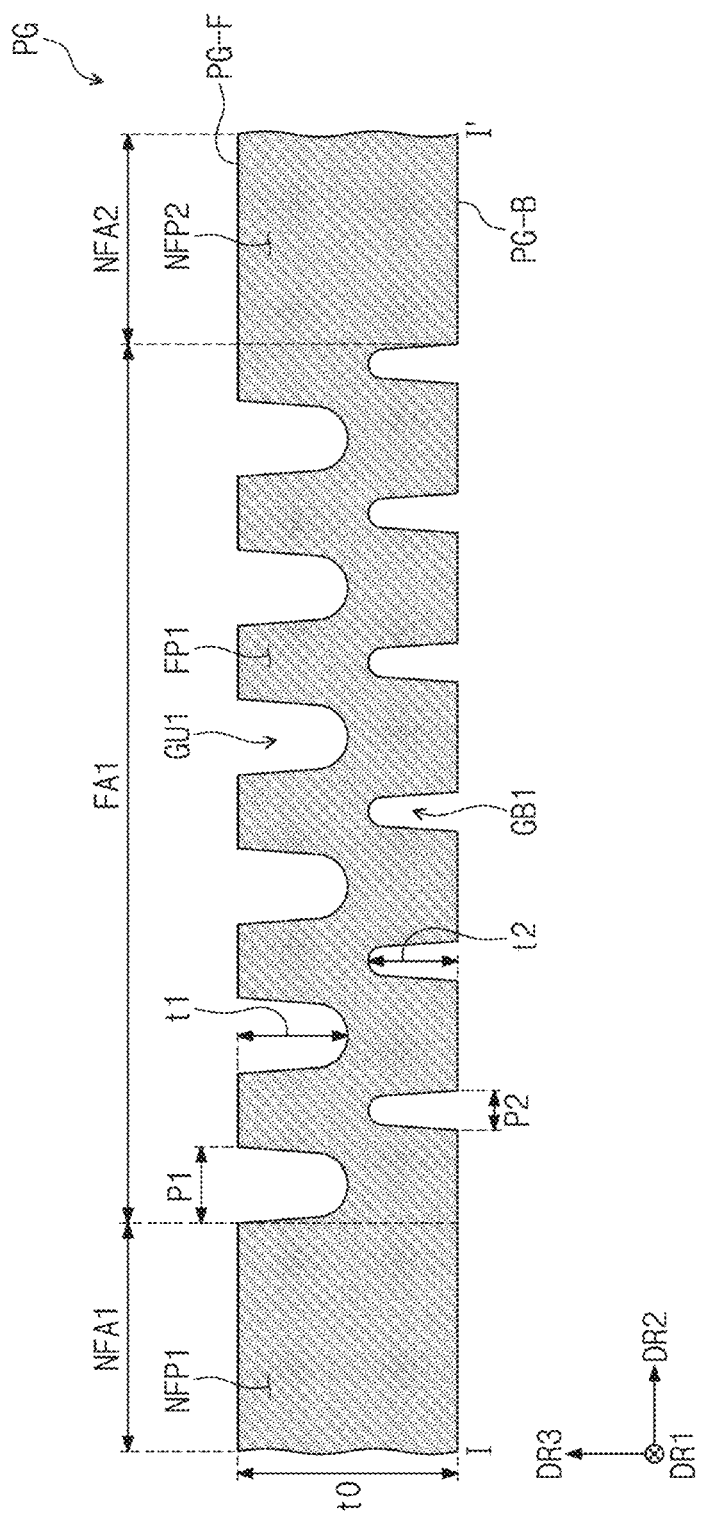

FIG. 7A to FIG. 7C are each a cross-sectional view illustrating an embodiment of a portion of a cross-section of a window according to the invention.

Referring to FIG. 7A, the height t1 of the first upper grooves GU1 may be the same as the height t2 of the first lower grooves GB1. Specifically, each of the height t1 of the first upper grooves GU1 and the height t2 of the first lower grooves GB1 may be less than half the thickness t0 of the window PG. An average thickness of the first folding portion FP1 in the window PG of FIG. 7A may be greater than an average thickness of the first folding portion FP1 in the window PG of FIG. 5C. Accordingly, the impact resistance of the window PG of FIG. 7A may be further improved.

In FIG. 7A, the width P1 of the first upper grooves GU1 may be the same as the width P2 of the first lower grooves GB1. However, the invention is not limited thereto.

Referring to FIG. 7B, the width P1 of the first upper grooves GU1 may be different from the width P2 of the first lower grooves GB1. In an embodiment, the width P1 of the first upper grooves GU1 may be less than the width P2 of the first lower grooves GB1, for example.

Referring to FIG. 7C, the width P1 of the first upper grooves GU1 may be different from the width P2 of the first lower grooves GB1. In an embodiment, the width P1 of the first upper grooves GU1 may be greater than the width P2 of the first lower grooves GB1, for example.

Figure 8A:
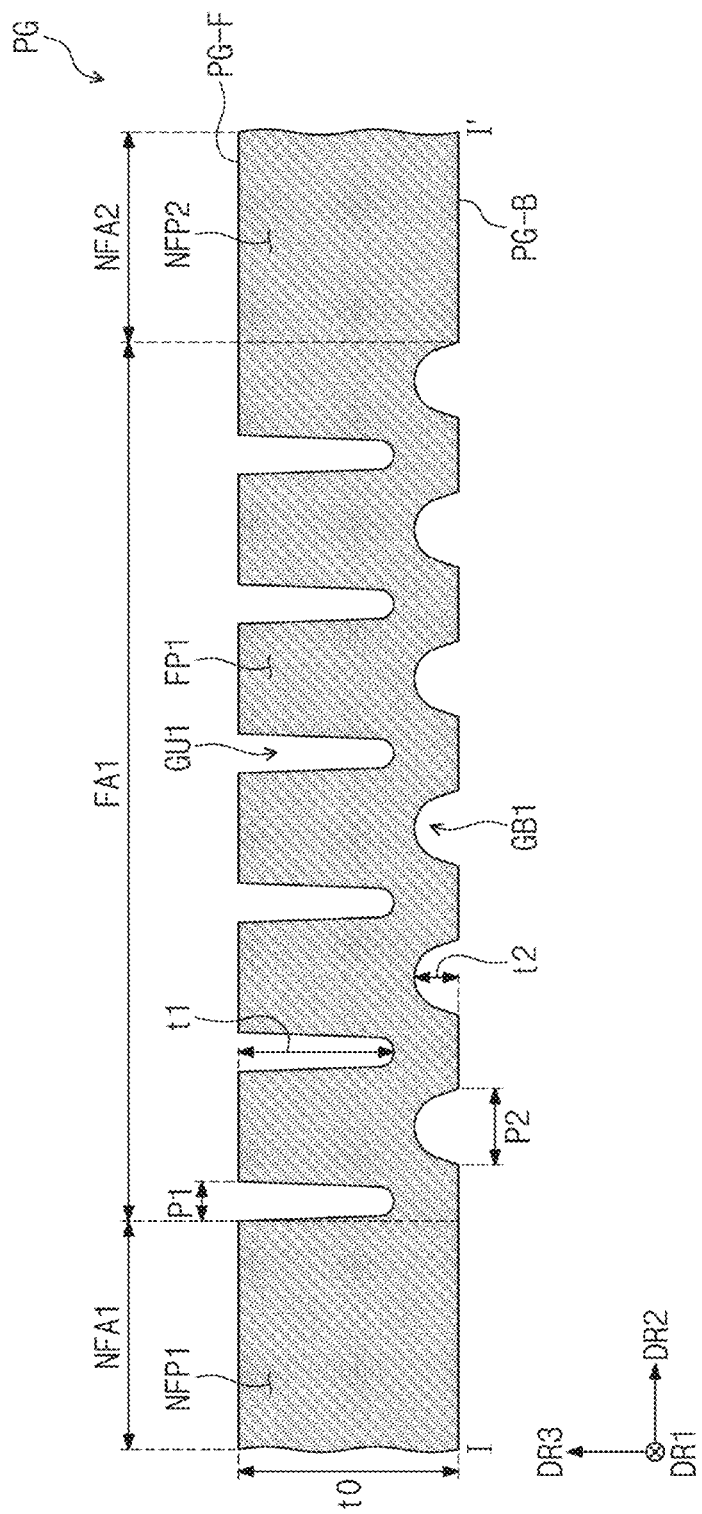
FIG. 8A and FIG. 8B are cross-sectional views illustrating an embodiment of a portion of a cross-section of a window according to the invention.
Figure 8B:
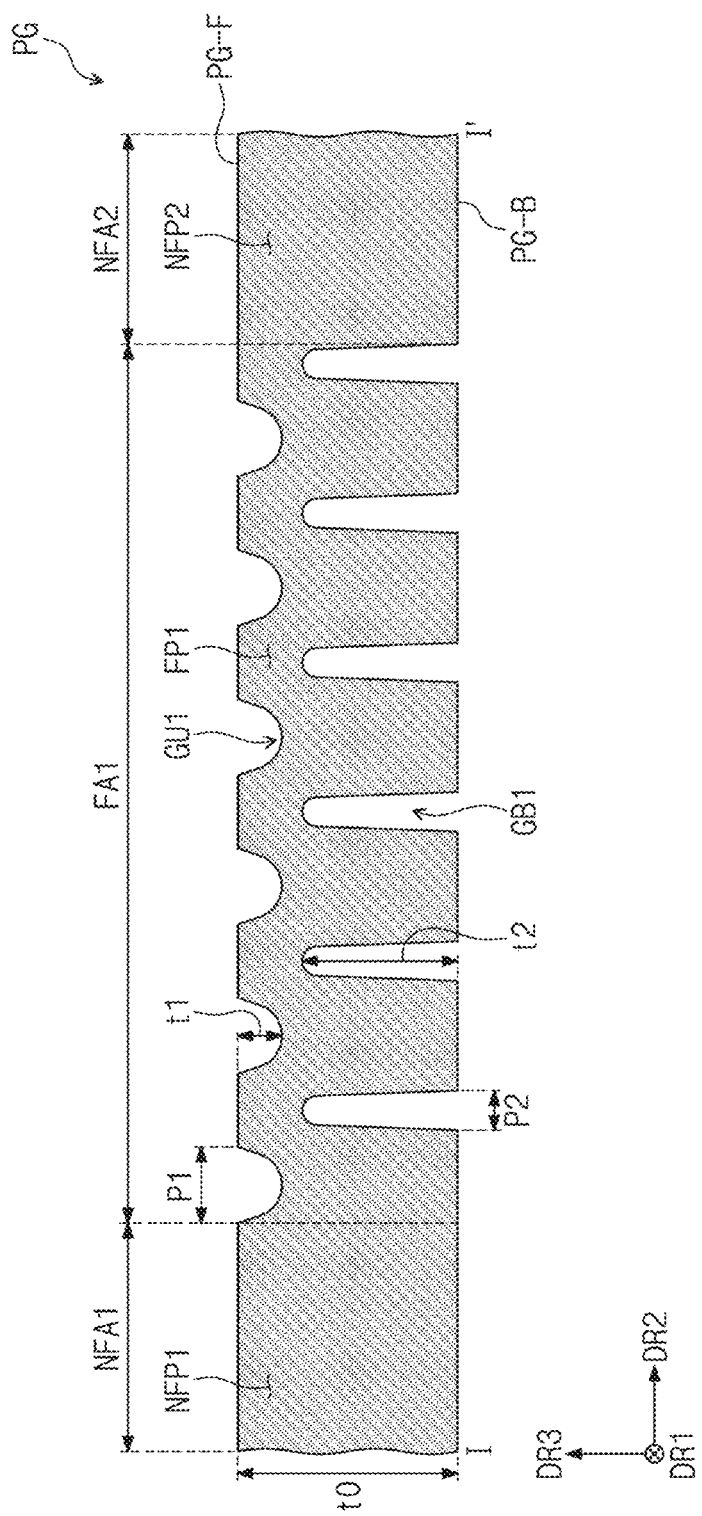

FIG. 8A and FIG. 8B are cross-sectional views illustrating an embodiment of a portion of a cross-section of a window according to the invention.

Referring to FIG. 8A, the height t1 of the first upper grooves GU1 and the height t2 of the first lower grooves GB1 may be different from each other, and the width P1 of the first upper grooves GU1 and the width P2 of the first lower grooves GB1 may be different from each other.

In an embodiment, the height t1 of the first upper grooves GU1 may be greater than the height t2 of the first lower grooves GB1, and the width P1 of the first upper grooves GU1 may be less than the width P2 of the first lower grooves GB1, for example.

The first upper grooves GU1 are less wide but higher than the first lower grooves GB1, so that the flexibility of the upper surface PG-F may be ensured.

The first lower grooves GB1 are less high but wider than the first upper grooves GU1, so that the flexibility of the lower surface PG-B be ensured.

Referring to FIG. 8B, the height t1 of the first upper grooves GU1 and the height t2 of the first lower grooves GB1 may be different from each other, and the width P1 of the first upper grooves GU1 and the width P2 of the first lower grooves GB1 may be different from each other.

In an embodiment, the height t1 of the first upper grooves GU1 may be less than the height t2 of the first lower grooves GB1, and the width P1 of the first upper grooves GU1 may be greater than the width P2 of the first lower grooves GB1, for example.

The first upper grooves GU1 are less high but wider than the first lower grooves GB1, so that the flexibility of the upper surface PG-F may be ensured.

The first lower grooves GB1 are less wide but higher than the first upper grooves GU1, so that the flexibility of the lower surface PG-B be ensured.

FIG. 9A to FIG. 9E are cross-sectional views illustrating an embodiment of a portion of a cross-section of a window according to the invention.

Unlike the window PG illustrated in FIG. 5C to FIG. 8B, in FIG. 9A to FIG. 9E, the first upper grooves GU1 and the first lower grooves GB1 may overlap in a plan view. In the third direction DR3, the first upper groove GU1 and the first lower groove GB1 may face each other.

A portion in the window PG overlapping the first upper grooves GU1 and the first lower grooves GB1 may have improved flexibility compared to a portion in the window PG not overlapping the first upper grooves GU1 and the first lower grooves GB1.

Figure 9A:
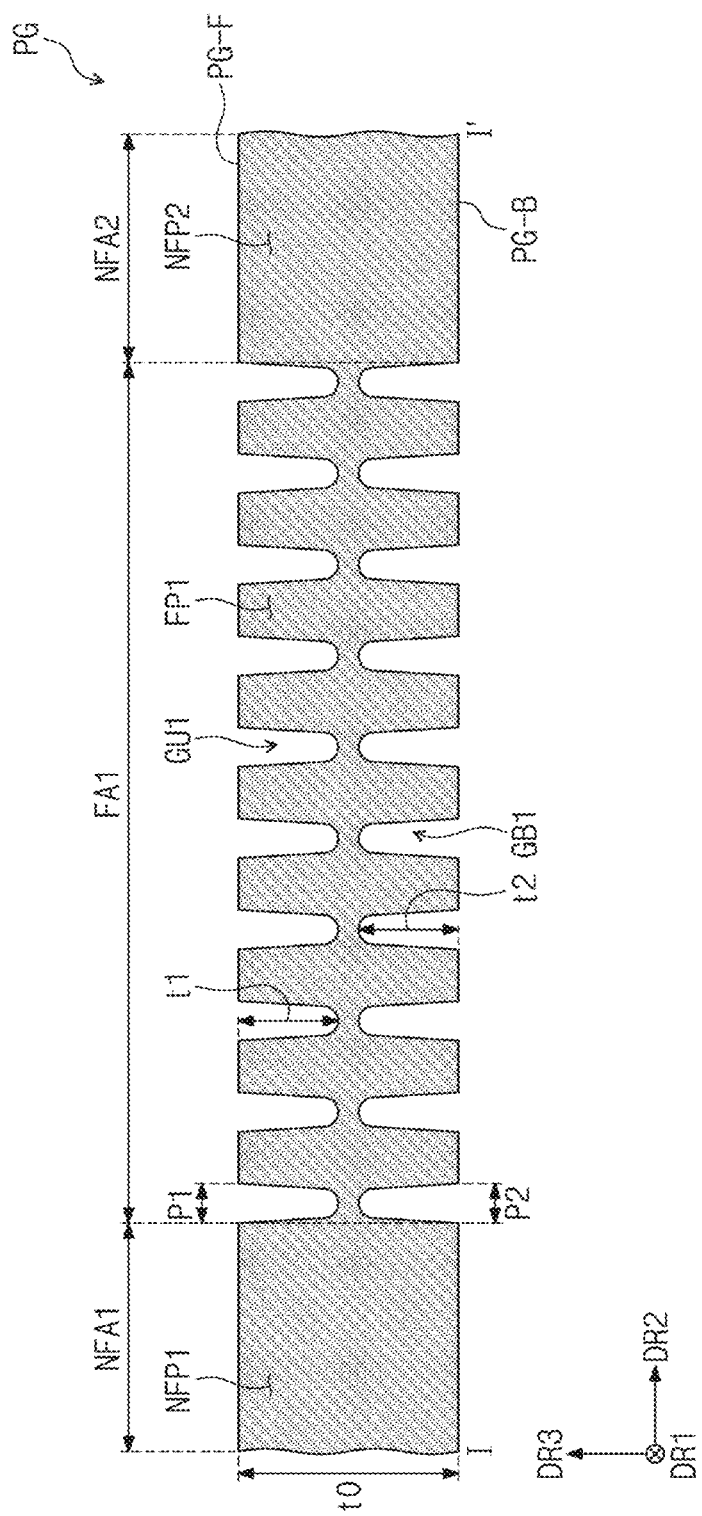

Referring to FIG. 9A, the height t1 of the first upper grooves GU1 may be the same as the height t2 of the first lower grooves GB1. In an embodiment, each of the height t1 of the first upper grooves GU1 and the height t2 of the first lower grooves GB1 may be less than half the thickness t0 of the window PG, for example.

The width P1 of the first upper grooves GU1 may be the same as the width P2 of the first lower grooves GB1.

Figure 9B:
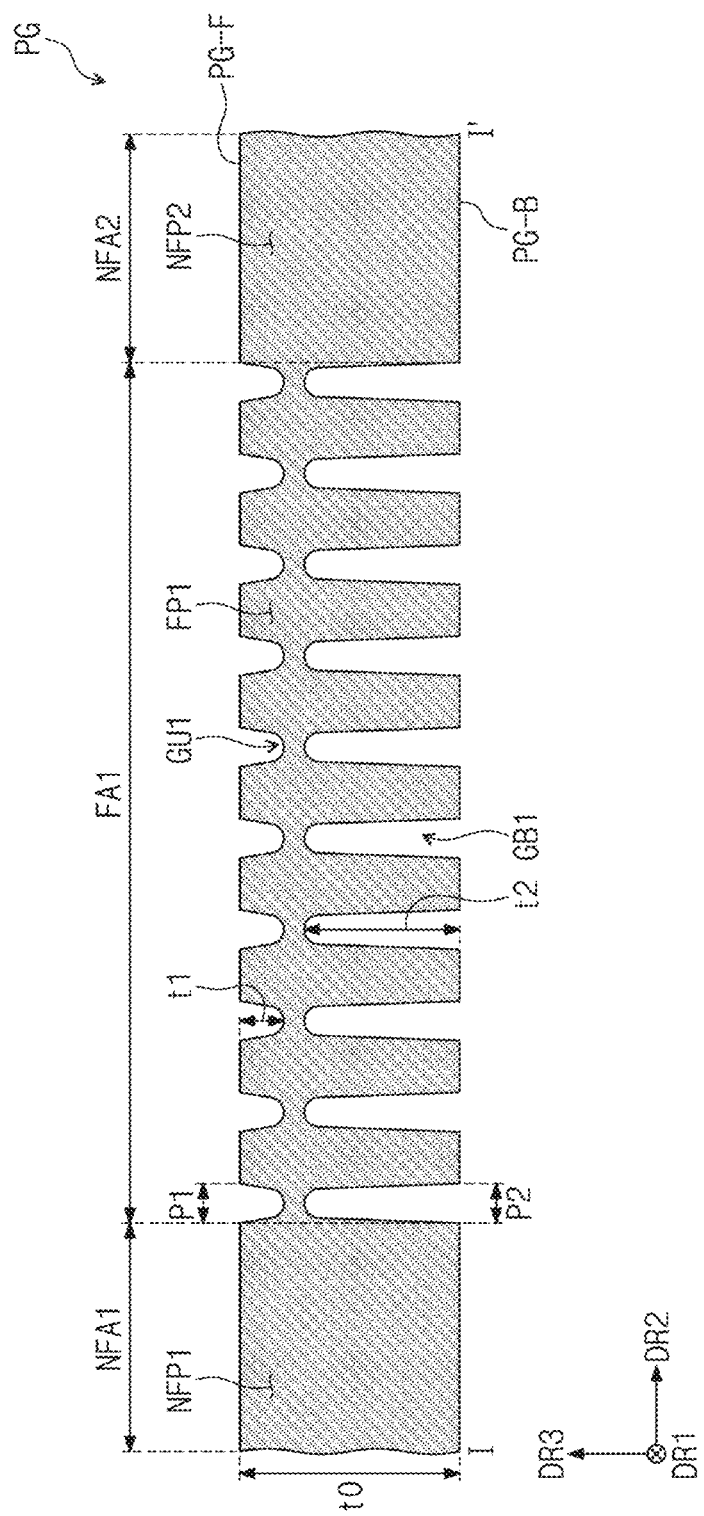

Referring to FIG. 9B, the height t1 of the first upper grooves GU1 may be different from the height t2 of the first lower grooves GB1. In an embodiment, the height t1 of the first upper grooves GU1 may be less than the height t2 of the first lower grooves GB1, for example.

The width P1 of the first upper grooves GU1 may be the same as the width P2 of the first lower grooves GB1.

Referring to FIG. 9C, the height t1 of the first upper grooves GU1 may be different from the height t2 of the first lower grooves GB1. In an embodiment, the height t1 of the first upper grooves GU1 may be greater than the height t2 of the first lower grooves GB1, for example.

The width P1 of the first upper grooves GU1 may be the same as the width P2 of the first lower grooves GB1.

Figure 9D:
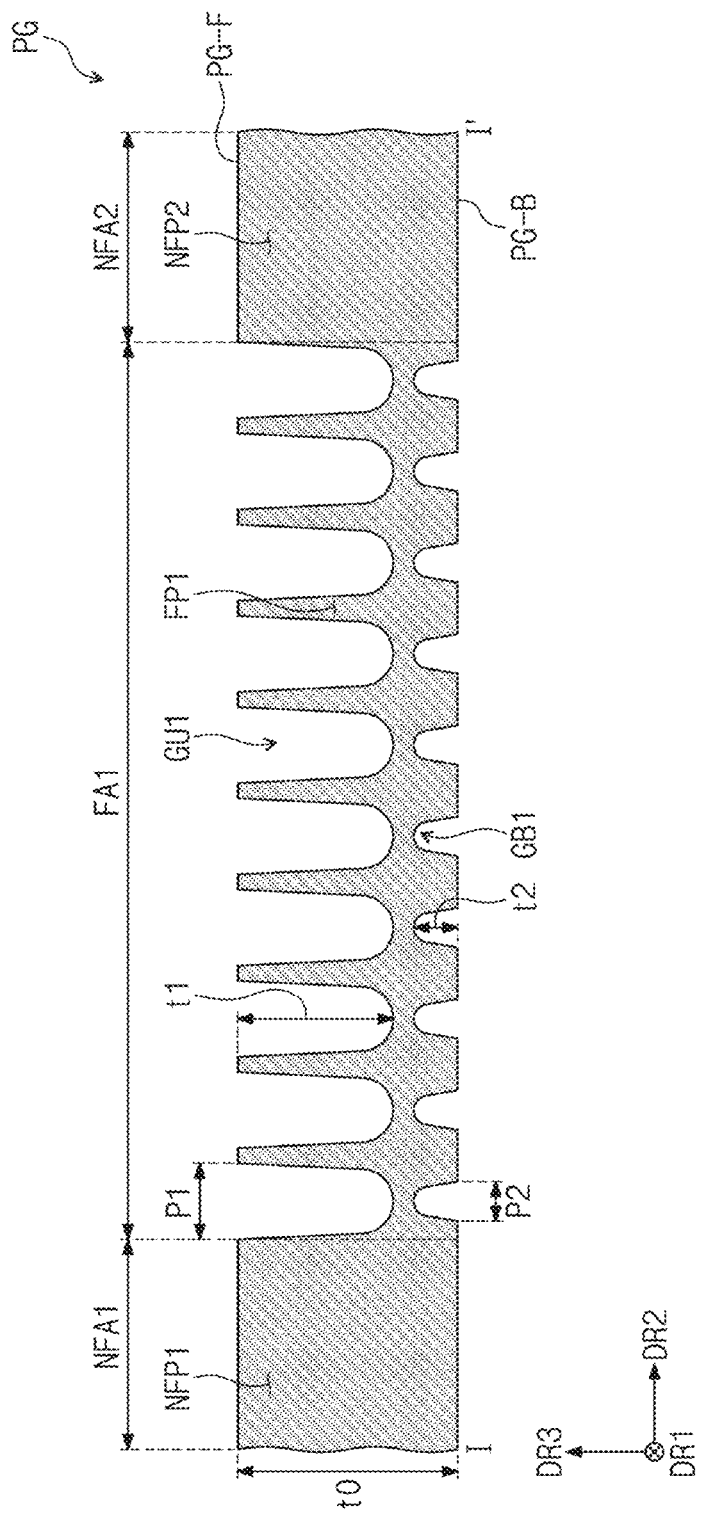

Referring to FIG. 9D, the height t1 of the first upper grooves GU1 may be different from the height t2 of the first lower grooves GB1, and the width P1 of the first upper grooves GU1 may be different from the width P2 of the first lower grooves GB1. In an embodiment, the height t1 of the first upper grooves GU1 may be greater than the height t2 of the first lower grooves GB1, and the width P1 of the first upper grooves GU1 may be greater than the width P2 of the first lower grooves GB1, for example. However, the invention is not limited thereto, and as described above with reference to FIG. 8B, the height t1 of the first upper grooves GU1 may be less than the height t2 of the first lower grooves GB1, and the width P1 of the first upper grooves GU1 may be greater than the width P2 of the first lower grooves GB1.

Referring to FIG. 9E, the height t1 of the first upper grooves GU1 may be different from the height t2 of the first lower grooves GB1, and the width P1 of the first upper grooves GU1 may be different from the width P2 of the first lower grooves GB1. In an embodiment, the height t1 of the first upper grooves GU1 may be less than the height t2 of the first lower grooves GB1, and the width P1 of the first upper grooves GU1 may be less than the width P2 of the first lower grooves GB1, for example.

However, the invention is not limited thereto, and as described above with reference to FIG. 8A, the height t1 of the first upper grooves GU1 may be greater than the height t2 of the first lower grooves GB1, and the width P1 of the first upper grooves GU1 may be less than the width P2 of the first lower grooves GB1.

However, the invention is not limited thereto.

Figure 10:
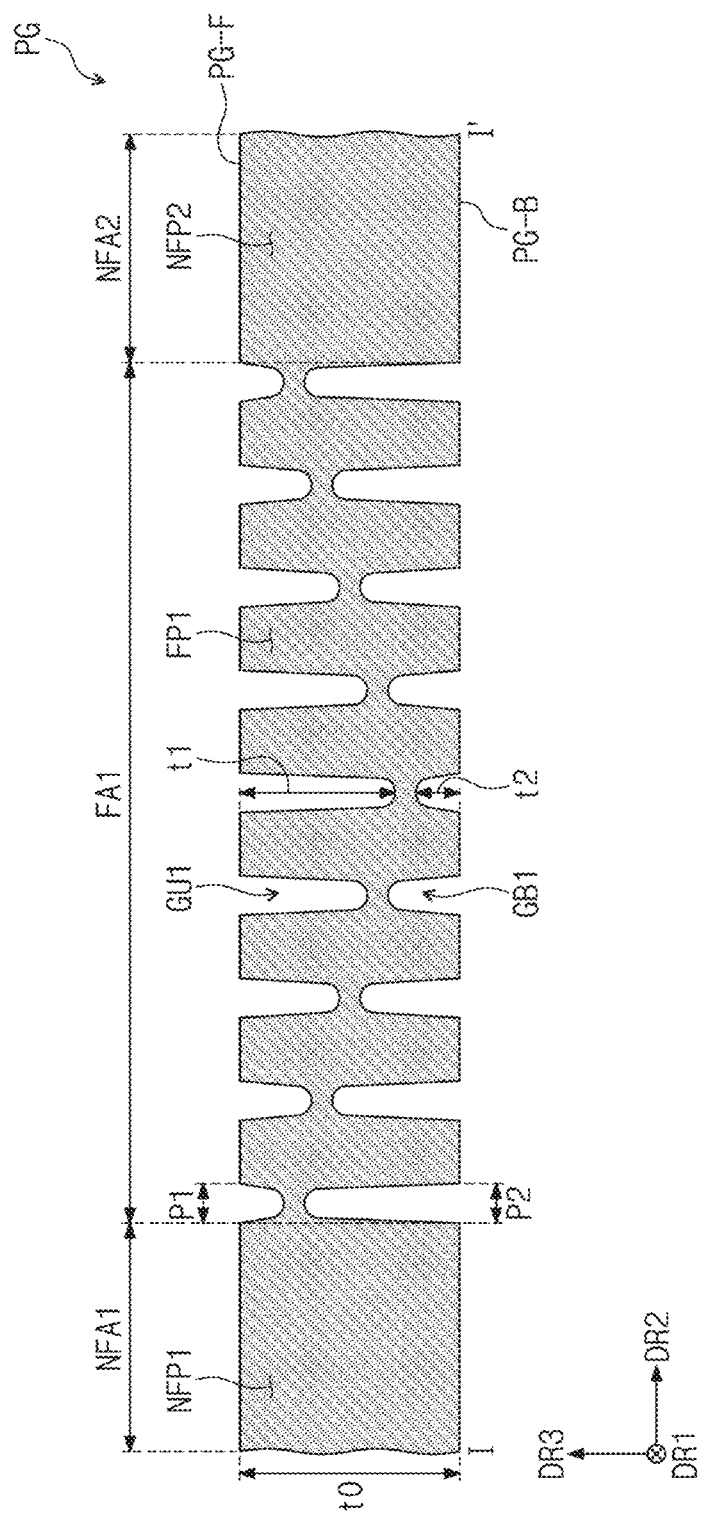
FIG. 10 is a cross-sectional view illustrating an embodiment of a portion of a cross-section of a window according to the invention.

FIG. 10 is a cross-sectional view illustrating an embodiment of a portion of a cross-section of a window according to the invention.

Referring to FIG. 10, each of the height t1 of the first upper grooves GU1 and the height t2 of the first lower grooves GB1 may not be constant. In an embodiment, FIG. 10 illustrates a case in which each of the first upper grooves GU1 and the first lower grooves GB1 is provided in an odd number.

In an embodiment, the height t1 of the first upper grooves GU1 may decrease from a central portion of the first folding region FA1 toward the first peripheral portion NFP1 and the second peripheral portion NFP2, for example. In an embodiment, the height t2 of the first lower grooves GB1 may increase from the central portion of the first folding region FA1 toward the first peripheral portion NFP1 and the second peripheral portion NFP2, for example.

However, the invention is not limited thereto, and each of the height t1 of the first upper grooves GU1 and the height t2 of the first lower grooves GB1 may decrease from the central portion of the first folding region FA1 toward the first peripheral portion NFP1 and the second peripheral portion NFP2. In an alternative embodiment, each of the height t1 of the first upper grooves GU1 and the height t2 of the first lower grooves GB1 may increase from the central portion of the first folding region FA1 toward the first peripheral portion NFP1 and the second peripheral portion NFP2.

In an embodiment, FIG. 10 illustrates that the width P1 of the first upper grooves GU1 are the same as the width P2 of the first lower grooves GB1, but the invention is not limited thereto, and the width P1 of the first upper grooves GU1 may be different from the width P2 of the first lower grooves GB1.

Figure 11:
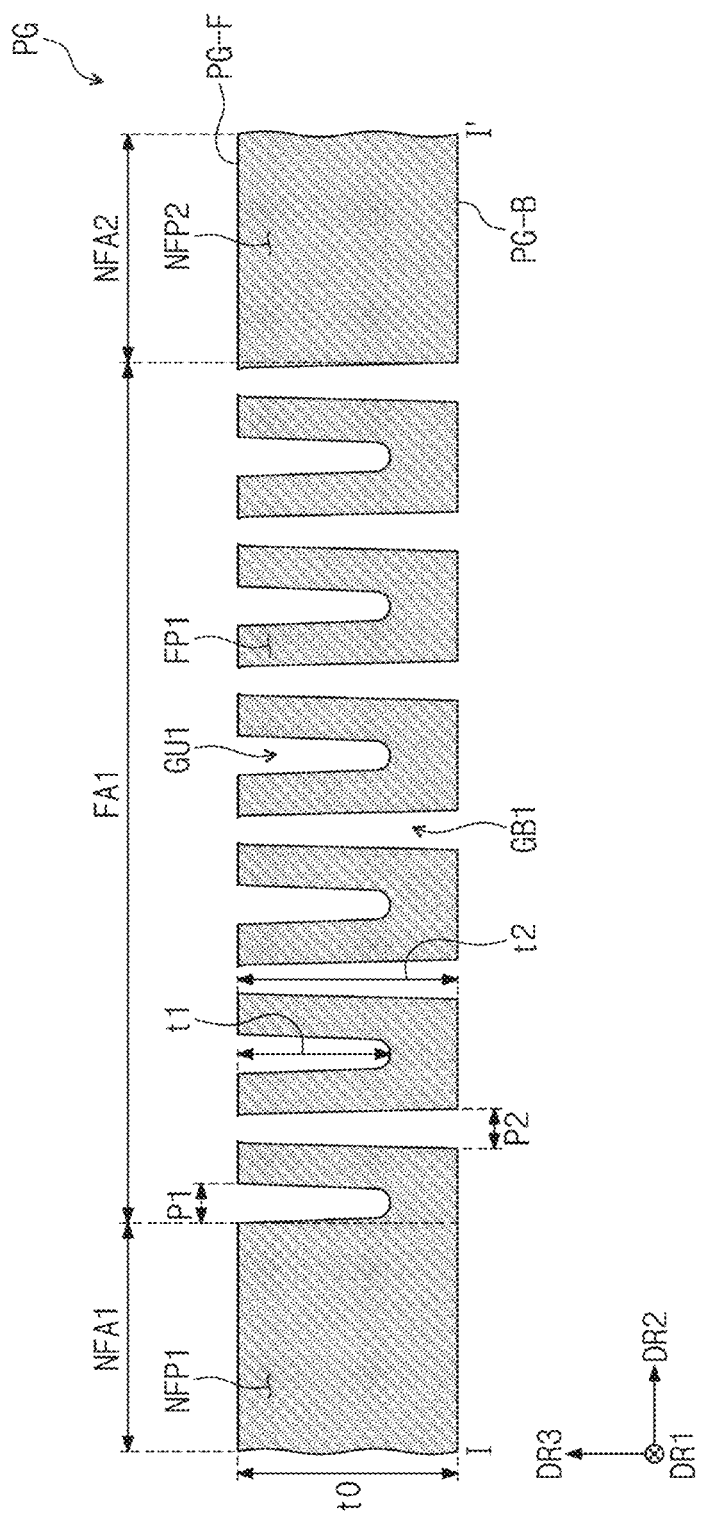
FIG. 11 is a cross-sectional view illustrating an embodiment of a portion of a cross-section of a window according to the invention.

FIG. 11 is a cross-sectional view illustrating an embodiment of a portion of a cross-section of a window according to the invention.

Referring to FIG. 11, the first upper grooves GU1 may have a shape recessed in the upper surface PG-F, and the first lower grooves GB1 may have a shape recessed in the lower surface PG-B and penetrated to the upper surface PG-F. That is, the height t1 of the first upper grooves GU1 may be less than the thickness t0 of the window PG, and the height t2 of the first lower grooves GB1 may be the same as the thickness t0 of the window PG.

In an embodiment, the width P2 of the first lower grooves GB1 may decrease as the distance in the third direction DR3 increases. However, the invention is not limited thereto, and the width P2 of the first lower grooves GB1 may increase, or have a constant value as the distance in the third direction DR3 increases.

In an embodiment, FIG. 11 illustrates that the width P1 of the first upper grooves GU1 are the same as the width P2 of the first lower grooves GB1, but the invention is not limited thereto, and the width P1 of the first upper grooves GU1 may be different from the width P2 of the first lower grooves GB1.

However, the invention is not limited thereto, and in an embodiment of the window PG, at least one of the first upper grooves GU1 and the first lower grooves GB1 may have a shape of penetrating from the upper surface PG-F to the lower surface PG-B.

Figure 12:
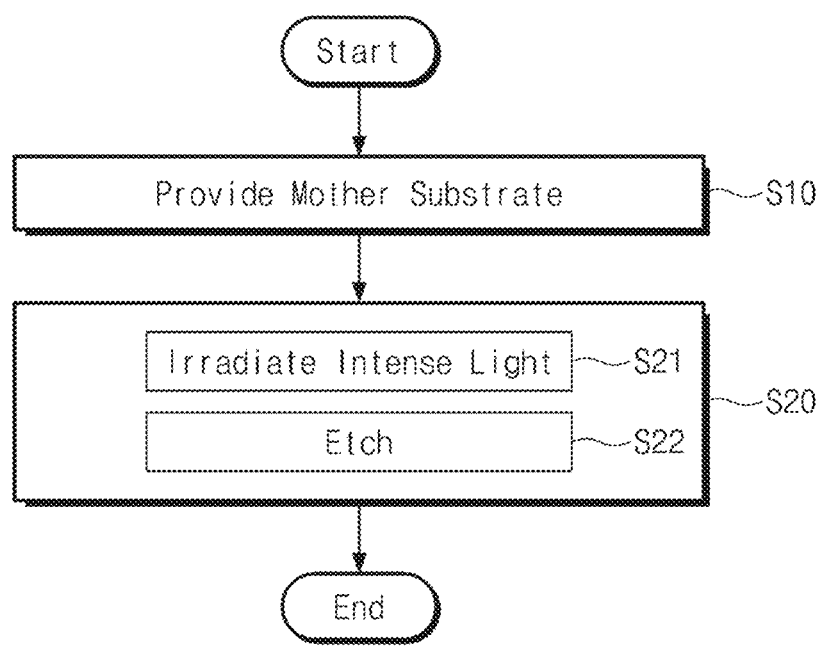
FIG. 12 is a flowchart of an embodiment of a method for manufacturing a window according to the invention.

FIG. 12 is a flowchart of an embodiment of a method for manufacturing a window according to the invention.

Referring to FIG. 12, the method for manufacturing a window may include providing a mother substrate (S10) and defining a groove (S20).

A mother substrate provided in the providing of a mother substrate (S10) is a substrate for manufacturing a window, and may correspond to a substrate before grooves are defined. The mother substrate provided in the providing of a mother substrate (S10) may be, depending on a manufacturing operation, a glass substrate before being reinforced, but is not limited thereto, and may be a tempered glass substrate which has undergone a reinforcement operation. In order to define a groove, the mother substrate may have virtual lines defined as an extension direction of the groove.

Thereafter, the defining of a groove on the mother substrate (S20) may be performed. The defining of a groove (S20) may include irradiating an intense light (e.g., laser) (S21) and etching (S22).

Laser irradiated in the irradiating of laser (S21) may overlap an irradiation point to change the refractive index of a portion of the mother substrate.

The material phase of a portion of the mother substrate irradiated with the laser may be deformed by the laser, and the refractive index of points irradiated with the laser and the refractive index of points of the mother substrate not irradiated with the laser may be different.

The etching (S22) may include a wet-etching operation in which an etching solution is provided to the point irradiated with the laser. A method for providing the etching solution may be a spray method for spraying an etching solution onto a point of a mother substrate irradiated with laser, a dipping method for dipping a mother substrate into an etching solution, or the like, but is not limited to any particular embodiment. The etching solution provided in an embodiment of the invention may include an alkali solution.

Figure 13A:
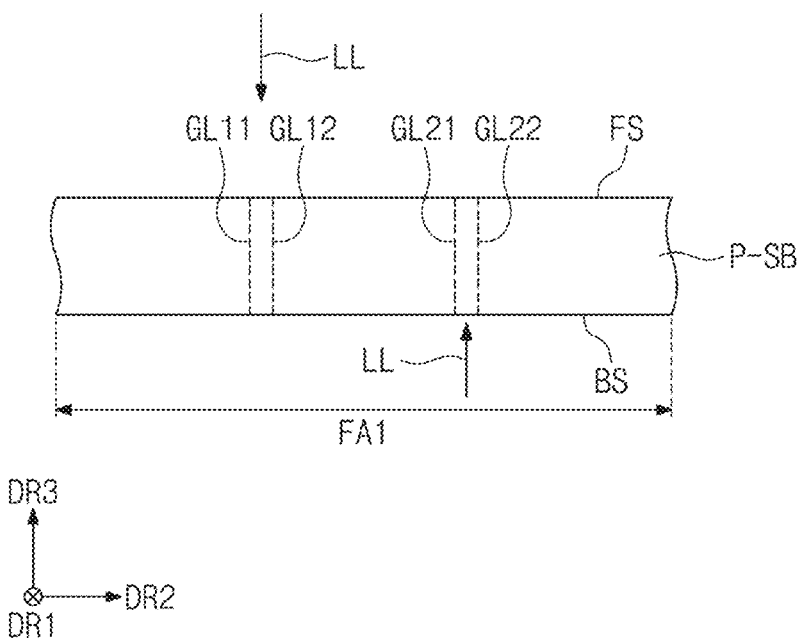
FIG. 13A to FIG. 13C are views illustrating an embodiment of each operation of a method for manufacturing a window according to the invention.
Figure 13B:
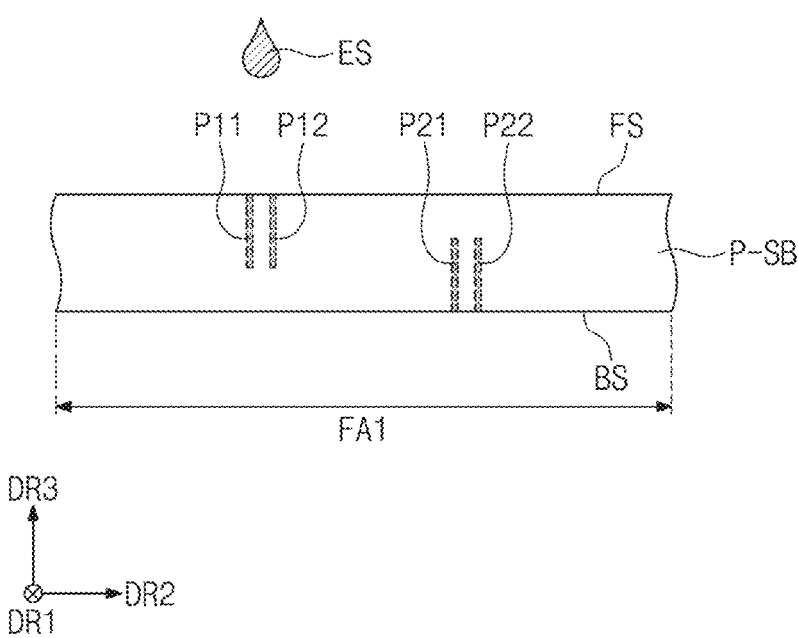
Figure 13C:
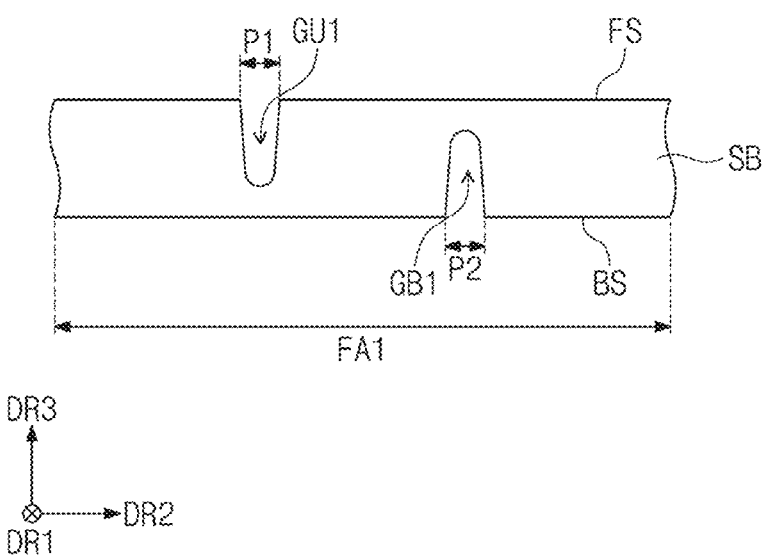

Hereinafter, with reference to each drawing, each operation of the method for manufacturing a window in an embodiment of the invention will be described in detail. FIG. 13A to FIG. 13C are views illustrating an embodiment of one operation of the method for manufacturing a window according to the invention.

Referring to FIG. 13A, a mother substrate P-SB may include an upper surface FS and a lower surface BS, and may have a thickness parallel to the third direction DR3. On a first folding region FA1 of the mother substrate P-SB, virtual lines GL11, GL12, GL21, and GL22 for defining grooves may be defined. In an operation to be described later, the lines GL11, GL12, GL21, and GL22 may correspond to positions at which the grooves are defined, and may be defined parallel to an extension direction of the grooves.

For convenience of description, FIG. 13A illustrates lines GL11, GL12, GL21, and GL22 defined to form two grooves. The lines GL11, GL12, GL21, and GL22 may be defined parallel to the third direction DR3, which is the extension direction of grooves to be defined. Hereinafter, the lines GL11, GL12, GL21, and GL22 are defined as first lines GL11 and GL12 and second lines GL21 and GL22.

Laser LL may be irradiated from the upper surface FS of the mother substrate P-SB toward a thickness direction of the mother substrate P-SB. In an alternative embodiment, the laser LL may be irradiated from the lower surface BS of the mother substrate P-SB toward a thickness direction of the mother substrate P-SB. The laser LL may be irradiated onto the mother substrate P-SB parallel to the third direction DR3. The laser LL may be irradiated overlapping the lines GL11, GL12, GL21, and GL22. In an embodiment, the laser LL may be irradiated from the upper surface FS of the mother substrate P-SB to overlap the first lines GL11 and GL12, for example. The laser LL may be irradiated from the lower surface BS of the mother substrate P-SB to overlap the second lines GL21 and GL22.

Each of the first lines GL11 and GL12 and the second lines GL21 and GL22 may be provided in a plurality of columns. However, the invention is not limited thereto, and the first lines GL11 and GL12 may be provided in one column, and the second lines GL21 and GL22 may be provided in a plurality of columns to adjust the width of a groove to be defined at a position at which the first lines GL11 and GL12 are defined to be smaller than the width of a groove to be defined at a position at which the second lines GL21 and GL22 are defined.

Points of the mother substrate P-SB irradiated with the laser LL may be melted locally by the laser LL to cause the deformation of a phase, and accordingly, the refractive index may be changed. Refractive indexes of the points of the mother substrate P-SB irradiated with the laser LL may be different from the refractive index of the mother substrate P-SB before irradiated with the laser LL. The laser LL may have a degree of intensity which may change the refractive index of one portion of the mother substrate P-SB without cutting the one portion of the mother substrate P-SB.

The laser LL may have pulse energy. The pulse duration of the laser LL may range from hundreds of picoseconds to tens of femtoseconds. In an embodiment, the pulse duration of the laser LL may be about 200 picoseconds, for example. The pulse duration of the laser LL may vary depending on the material or thickness of the mother substrate P-SB. The wavelength of the laser LL may be about 250 nanometers (nm) to about 1500 nm or less, and may be, specifically, about 340 nm to about 1060 nm or less.

The laser LL may be a non-diffractive beam. In an embodiment, the laser LL may be a Bessel beam, for example. However, the invention is not limited thereto, and the laser LL may be a Gaussian beam.

FIG. 13B illustrates a cross-sectional view of the mother substrate P-SB after the irradiation of the laser LL (refer to FIG. 13A). The first lines GL11 and GL12 may be irradiated with the laser LL (refer to FIG. 13A) to form first portions P11 and P12. The second lines GL21 and GL22 may be irradiated with the laser LL (refer to FIG. 13A) to form second portions P21 and P22. For convenience of description, the first portions P11 and P12 and the second portions P21 and P22 irradiated with laser are illustrated as hatched regions, but substantially, it may be difficult to distinguish the first portions P11 and P12 and the second portions P21 and P22 with the naked eye from portions not irradiated with the laser in the mother substrate P-SB.

Refractive indexes of the first portions P11 and P12 and the second portions P21 and P22 after the irradiation of the laser may be different from the refractive index of the mother substrate P-SB before the irradiation of the laser.

Each of the first portions P11 and P12 and the second portions P21 and P22 may have a predetermined diameter in a plan view. In an embodiment, the diameter of each of the first portions P11 and P12 and the second portions P21 and P22 may be about 3 μm or less, for example. The laser LL changes the refractive index of the mother substrate P-SB without forming a physical hole therein, and sizes of portions whose refractive indexes are changed are small, so that the appearance change of the mother substrate P-SB caused by the laser may not be easily visually recognized, and may be visually recognized using a high-magnification microscope or the like.

Each of the first portions P11 and P12 and the second portions P21 and P22 may be extended along the third direction DR3. The first portions P11 and P12 may be spaced apart from each other by a predetermined interval. The second portion P21 and P22 may be spaced apart from each other by a predetermined interval. The predetermined interval may be a scale of a few micrometers (μm).

Gaps between the first portions P11 and P12 and the second portion P21 and P22 may be spaced apart by a predetermined interval along the second direction DR2. According to the intervals between the first portions P11 and P12 and the second portion P21 and P22, intervals between the grooves GU1 and GB1 (refer to FIG. 13C) to be defined may vary.

Each of the first portions P11 and P12 and the second portions P21 and P22 may have a predetermined thickness along a thickness direction. The thickness of each of the first portions P11 and P12 and the second portions P21 and P22 may be smaller than the thickness of the mother substrate P-SB. By adjusting the intensity of laser, the thicknesses of the first portions P11 and P12 and the second portions P21 and P22 may be controlled. According to the thicknesses of the first portions P11 and P12 and the second portions P21 and P22, the depth of ach of the grooves GU1 and GB1 (refer to FIG. 13C) to be defined may vary.

As described above, since the first lines GL11 and GL12 and the second lines GL21 and GL22 are provided in a plurality of columns, the first portions P11 and P12 and the second portions P21 and P22 may also be formed or provided in a plurality of columns.

An etching solution ES may be provided on the first and second portions P11, P12, P21, and P22. The etching solution ES may be provided by a spraying method or dipping method, but is not limited to any particular embodiment. The etching solution ES may etch one portion of the mother substrate P-SB around the first and second portions P11, P12, P21, and P22.

The etching solution ES may include an alkali solution. In an embodiment, the etching solution ES may include a sodium hydroxide (NaOH) solution or a potassium hydroxide ("KOH") solution, and preferably, the etching solution ES may include the sodium hydroxide solution, for example.

Shapes of the grooves GU1 and GB1 (refer to FIG. 13C) may vary depending on an etching rate or etching amount. As the concentration and temperature of the etching solution ES increase, the etching rate may increase. As a period of time of exposure to the etching solution ES increases, that is, as the etching time increases, the etching amount may increase.

Particularly, as the temperature of the etching solution ES increases, the reactivity of the etching solution ES may increase, and thus, may increase the etching rate. The temperature of the etching solution ES may be room temperature or higher. In an embodiment, the temperature of the etching solution ES may be about 100 degrees Celsius to 150 degrees Celsius or lower, for example. When the temperature of the etching solution ES is lower than 100 degrees Celsius, the reactivity of the etching solution ES may decrease, and the process time for defining a groove may increase. When the temperature of the etching solution ES is higher than 150 degrees Celsius, the mother substrate P-SB is exposed to high temperatures, and thus, may be damaged.

FIG. 13C illustrates a cross-sectional view of a substrate SB in which grooves GU1 and GB1 are defined after a predetermined period of time after the exposure to the etching solution ES in the state of the one operation illustrated in FIG. 13B.

The plurality of grooves GU1 and GB1 may be defined such that a portion of the substrate SB may be recessed through the laser irradiation operation S21 and the etching operation S22 described above. Here, the substrate SB may correspond to the mother substrate P-SB in which the plurality of grooves GU1 and GB1 is defined. The description described above may be equally applied to descriptions of the plurality of grooves GU1 and GB1. In an embodiment, a first groove GU1 defined by being recessed in an upper surface FS of the substrate SB may correspond to the above-described first upper groove GU1 (refer to FIG. 5C), for example. In addition, a method for forming the first groove GU1 may be equally applied to a method for forming the second upper groove GU2 (refer to FIG. 5D). A second groove GB1 defined by being recessed in a lower surface BS of the substrate SB may correspond to the above-described first lower groove GB1 (refer to FIG. 5C). In addition, a method for forming the second groove GB1 may be equally applied to a method for forming the second lower groove GB2 (refer to FIG. 5D).

In an embodiment, the width P1 of the first upper groove GU1 may be the same as the width P2 of the first lower groove GB1. However, the invention is not limited to what is illustrated in FIG. 13A to FIG. 13C, and in an embodiment of the method for manufacturing a window, in order to manufacture the windows of various embodiments illustrated in FIG. 5E to FIG. 11B, positions of lines, the number of columns of laser irradiated onto the position at which each groove is defined, the time during which the laser is irradiated, intervals between positions at which the laser is irradiated, the intensity of the laser, or the like may be adjusted. The window PG in an embodiment includes the first upper groove GU1 extended in the first direction DR1, the first lower groove GB1 extended in the first direction DR1, the second upper groove GU2 extended in the second direction DR2, and the second lower groove GB2 extended in the second direction DR2, and thus, may be folded about two or more folding axes. Specifically, the window PG includes the first upper groove GU1 extended in the first direction DR1 and the first lower groove GB1 extended in the first direction DR1, and thus, may be folded about the first folding axis FX1 extended in the first direction DR1, and includes the second upper groove GU2 extended in the second direction DR2 and the second lower groove GB2 extended in the second direction DR2, and thus, may be folded about the second folding axis FX2 extended in the second direction DR2.

The window PG in an embodiment of the invention includes the fifth portion PT5 in which the first upper groove GU1 and the second upper groove GU2 intersect each other, and the first lower groove GB1 and the second lower groove GB2 intersect each other, and thus, may be folded with respect to each of the first folding axis FX1 and the second folding axis FX2 crossing each other.

In an embodiment, the grooves GU and GB recessed in each of the upper surface PG-F and the lower surface PG-B are defined in the window PG according to the invention, and thus, the window PG may be prevented from being damaged when folded.

The display device DD including the window PG of the invention may have improved folding properties and improved impact resistance.

A window of the invention may be folded about each of two folding axes crossing each other.

A display device of the invention has improved folding properties, and prevent a window from being damaged when the display device is folded.

Although the invention has been described with reference to a preferred embodiment of the invention, it will be understood by those skilled in the art that various changes in form and details may be made therein without departing from the spirit and scope of the invention as set forth in the following claims. Accordingly, the technical scope of the invention is not intended to be limited to the contents set forth in the detailed description of the specification, but is intended to be defined by the appended claims.

What is claimed is:
1. A window comprising:
a first folding portion foldable about a first folding axis extended in a first direction, and including an upper surface and a lower surface facing each other; and
a second folding portion foldable about a second folding axis extended in a second direction crossing the first direction, and including the upper surface, the lower surface and a portion of the first folding portion,
wherein:
a plurality of first upper grooves each of which is extended in the first direction and recessed from the upper surface and a plurality of first lower grooves each of which is extended in the first direction and recessed from the lower surface are defined in the first folding portion,
a plurality of second upper grooves each of which is extended in the second direction and recessed from the upper surface and a plurality of second lower grooves each of which is extended in the second direction and recessed from the lower surface are defined in the second folding portion,
the portion of the first folding portion included in the second folding portion is defined as a crossing portion,
the plurality of first upper grooves, the plurality of first lower grooves, the plurality of second upper grooves, and the plurality of second lower grooves are disposed in the crossing portion, and
the plurality of first upper grooves, the plurality of first lower grooves, the plurality of second upper grooves, and the plurality of second lower grooves are formed within one layer.

2. The window of claim 1, further comprising a first peripheral portion and a second peripheral portion spaced apart from each other in the second direction with the first folding portion interposed therebetween,
   wherein the plurality of second upper grooves and the plurality of second lower grooves are defined in a portion of each of the first peripheral portion and the second peripheral portion.

3. The window of claim 2, wherein each of the first peripheral portion, the first folding portion, and the second peripheral portion is foldable about the second folding axis.

4. The window of claim 1, further comprising a third peripheral portion and a fourth peripheral portion spaced apart from each other in the first direction with the second folding portion interposed therebetween,
   wherein the plurality of first upper grooves and the plurality of first lower grooves are defined in a portion of each of the third peripheral portion and the fourth peripheral portion.

5. The window of claim 4, wherein each of the third peripheral portion, the second folding portion, and the fourth peripheral portion is foldable about the first folding axis.

6. The window of claim 1, wherein the plurality of first upper grooves and the plurality of first lower grooves do not overlap each other in a plan view.

7. The window of claim 6, wherein the plurality of first upper grooves and the plurality of first lower grooves are alternately defined with each other.

8. The window of claim 1, wherein the plurality of first upper grooves and the plurality of first lower grooves overlap each other in a plan view.

9. The window of claim 1, wherein an average value of heights at which the plurality of first upper grooves is recessed from the upper surface is substantially identical to an average value of heights at which the plurality of first lower grooves is recessed from the lower surface.

10. The window of claim 1, wherein an average value of heights at which the plurality of first upper grooves is recessed from the upper surface is different from an average value of heights at which the plurality of first lower grooves is recessed from the lower surface.

11. The window of claim 1, wherein an average value of widths of the plurality of first upper grooves measured in the second direction from the upper surface is substantially identical to an average value of widths of the plurality of first lower grooves measured in the second direction from the lower surface.

12. The window of claim 1, wherein an average value of widths of the plurality of first upper grooves measured in the second direction from the upper surface is different from an average value of widths of the plurality of first lower grooves measured in the second direction from the lower surface.

13. The window of claim 1, wherein the crossing portion is defined in a center portion of each of the first folding portion and the second folding portion.

14. The window of claim 1, wherein:
   the plurality of first upper grooves each and the plurality of first lower grooves each are spaced apart from each other in the second direction, and
   the plurality of second upper grooves each and the plurality of second lower grooves each are spaced apart from each other in the first direction.

15. The window of claim 1, wherein the plurality of first upper grooves and the plurality of first lower grooves are each symmetrical about the first folding axis.

16. The window of claim 1, wherein the plurality of second upper grooves and the plurality of second lower grooves are each symmetrical around the second folding axis.

17. A window comprising:
   a first portion, a second portion, and a third portion sequentially defined in a first direction;
   a fourth portion, a fifth portion, and a sixth portion sequentially defined in the first direction, overlapping each of the first to third portions in a second direction crossing the first direction, and disposed respectively below the first to third portions in the second direction; and
   a seventh portion, an eighth portion, and a ninth portion sequentially defined in the first direction, overlapping each of the first to third portions in the second direction, and disposed respectively below the fourth to sixth portions in the second direction in the second direction,
   wherein:
      upper surfaces of the first to ninth portions are disposed in a same plane, and together define a first surface,
      lower surfaces of the first to ninth portions are disposed in a same plane, and together define a second surface,
      a plurality of first upper grooves recessed from the first surface and extended in the first direction is defined in each of the fourth to sixth portions,
   a plurality of second upper grooves recessed from the first surface and extended in the second direction is defined in each of the second portion, the fifth portion, and the eighth portion,
   a plurality of first lower grooves recessed from the second surface and extended in the first direction is further defined in each of the fourth to sixth portions,
   a plurality of second lower grooves recessed from the second surface and extended in the second direction is further defined in each of the second portion, the fifth portion, and the eighth portion, and
   the plurality of first upper grooves, the plurality of first lower grooves, the plurality of second upper grooves, and the plurality of second lower grooves are formed within one layer.

18. The window of claim 17, wherein:
   the fourth to sixth portions are foldable about a first folding axis extended in the first direction, and
   the second portion, the fifth portion, and the eighth portion are foldable about a second folding axis extended in the second direction.

19. An electronic device comprising:
   a display device comprising:
      a display module which is foldable; and
      a window disposed on the display module, the window including:
         a first folding portion foldable about a first folding axis extended in a first direction, and including an upper surface and a lower surface facing each other; and
         a second folding portion foldable about a second folding axis extended in a second direction crossing the first direction, including the upper surface and the lower surface, and including a portion of the first folding portion,
      wherein:
      a plurality of first upper grooves each of which is extended in the first direction and recessed from the upper surface and a plurality of first lower grooves each of which is extended in the first direction and recessed from the lower surface are defined in the first folding portion, a plurality of second upper grooves each of which is extended in the second direction and recessed from the upper surface and a plurality of second lower grooves each of which is extended in the second direction and recessed from the lower surface are defined in the second folding portion, the portion of the first folding portion included in the second folding portion is defined as a crossing portion, wherein the plurality of first upper grooves, the plurality of first lower grooves, the plurality of second upper grooves, and the plurality of second lower grooves are defined in the crossing portion, and the plurality of first upper grooves, the plurality of first lower grooves, the plurality of second upper grooves, and the plurality of second lower grooves are formed within one layer.

* * * * *